(12) United States Patent
Bookbinder et al.

(10) Patent No.: US 11,022,745 B2
(45) Date of Patent: Jun. 1, 2021

(54) MICROSTRUCTURED AND PATTERNED LIGHT GUIDE PLATES AND DEVICES COMPRISING THE SAME

(71) Applicant: CORNING INCORPORATED, Corning, NY (US)

(72) Inventors: Dana Craig Bookbinder, Corning, NY (US); Steven S Rosenblum, Ithaca, NY (US); Natesan Venkataraman, Painted Post, NY (US); Robert Stephen Wagner, Corning, NY (US); James Andrew West, Painted Post, NY (US); Nathaniel David Wetmore, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/474,460

(22) PCT Filed: Dec. 18, 2017

(86) PCT No.: PCT/US2017/066923
§ 371 (c)(1),
(2) Date: Jun. 27, 2019

(87) PCT Pub. No.: WO2018/125624
PCT Pub. Date: Jul. 5, 2018

(65) Prior Publication Data
US 2019/0339440 A1 Nov. 7, 2019

Related U.S. Application Data

(60) Provisional application No. 62/440,029, filed on Dec. 29, 2016.

(51) Int. Cl.
*F21V 8/00* (2006.01)

(52) U.S. Cl.
CPC ......... *G02B 6/0065* (2013.01); *G02B 6/0036* (2013.01); *G02B 6/0038* (2013.01)

(58) Field of Classification Search
CPC .. G02B 6/0036; G02B 6/0038; G02B 6/0051; G02B 6/0053; G02B 6/0065
See application file for complete search history.

(56) References Cited

U.S. PATENT DOCUMENTS 5,674,790 A 10/1997 Araujo
6,060,157 A * 5/2000 LaPerre .................. B44C 1/16
428/212

(Continued)

FOREIGN PATENT DOCUMENTS

CN 1797122 A 7/2006
CN 101105606 A 1/2008

(Continued)

OTHER PUBLICATIONS

International Search Report and Written Opinion of the International Searching Authority; PCT/US2017/066923; dated Mar. 9, 2018; 13 pages; European Patent Office.

(Continued)

*Primary Examiner* — Tsion Tumebo

(57) ABSTRACT

Disclosed herein are light guide plates (100, 100', 100") comprising a transparent substrate (110) having an edge surface (150), a light emitting first major surface (160), and an opposing second major surface (170); and a polymeric film (120) disposed on at least one of the first (160) and second (170) major surfaces of the transparent substrate, wherein the polymeric film (120) comprises a plurality of microstructures (130) and/or a plurality of light extraction features. At least one light source (140) may be coupled to the edge surface (150) of the transparent substrate (110). Display and lighting devices comprising such light guide (Continued)

plates are further disclosed, as well as methods for manufacturing such light guide plates.

33 Claims, 14 Drawing Sheets

(56) References Cited

U.S. PATENT DOCUMENTS

| | | | |
|---|---|---|---|
| 6,467,922 B1 | 10/2002 | Blanc et al. | |
| 7,991,257 B1* | 8/2011 | Coleman | G02B 6/0065 385/129 |
| 8,033,706 B1* | 10/2011 | Kelly | G02F 1/133606 362/607 |
| 8,152,348 B2* | 4/2012 | Kanade | G02B 6/0041 362/607 |
| 8,619,363 B1* | 12/2013 | Coleman | G02B 5/1814 359/576 |
| 8,657,472 B2* | 2/2014 | Aronson | G02B 5/045 362/333 |
| 9,772,080 B2* | 9/2017 | Vasylyev | G02B 5/0278 |
| 9,952,375 B2* | 4/2018 | Nolan | G02B 5/0294 |
| 9,989,692 B2 | 6/2018 | Etienne et al. | |
| 10,082,616 B2 | 9/2018 | Hijiya et al. | |
| 10,288,792 B2* | 5/2019 | Allen | G02B 6/0041 |
| 10,459,284 B1* | 10/2019 | Kuo | G02F 1/133528 |
| 2001/0033135 A1* | 10/2001 | Duggal | H01L 27/3211 313/506 |
| 2003/0123244 A1* | 7/2003 | Ishitaka | G02B 6/0036 362/610 |
| 2003/0214717 A1* | 11/2003 | Kaminsky | G02F 1/133504 359/599 |
| 2004/0027062 A1* | 2/2004 | Shiang | H01L 51/5262 313/506 |
| 2004/0061959 A1 | 4/2004 | Kim | |
| 2004/0121896 A1* | 6/2004 | Landa | C03C 3/087 501/71 |
| 2004/0202822 A1* | 10/2004 | Bourdelais | B32B 27/36 428/143 |
| 2004/0234724 A1* | 11/2004 | Kaminsky | G02B 5/045 428/141 |
| 2005/0122591 A1* | 6/2005 | Parker | G02B 6/0065 359/619 |
| 2006/0290253 A1* | 12/2006 | Yeo | G02B 5/0278 313/116 |
| 2008/0008849 A1* | 1/2008 | Mazurek | B29C 59/046 428/40.1 |
| 2008/0043173 A1 | 2/2008 | Lin et al. | |
| 2008/0232135 A1* | 9/2008 | Kinder | G02B 6/0053 362/615 |
| 2008/0239755 A1* | 10/2008 | Parker | F21V 11/00 362/619 |
| 2008/0285310 A1* | 11/2008 | Aylward | G02B 6/0068 362/626 |
| 2009/0040771 A1* | 2/2009 | Greener | G02B 6/0038 362/330 |
| 2010/0110331 A1* | 5/2010 | Han | G02B 5/0215 349/62 |
| 2010/0302479 A1* | 12/2010 | Aronson | B29D 11/00326 349/64 |
| 2010/0307705 A1* | 12/2010 | Rahm | B42D 25/373 162/140 |
| 2011/0045248 A1* | 2/2011 | Hoffmuller | B42D 25/342 428/156 |
| 2011/0095518 A1* | 4/2011 | Hoffmuller | G03H 1/0252 283/85 |
| 2011/0157521 A1* | 6/2011 | Shimazaki | G02B 6/0053 349/65 |
| 2011/0244187 A1* | 10/2011 | Rinko | B29D 11/0073 428/156 |
| 2012/0113622 A1* | 5/2012 | Aronson | G02B 27/126 362/97.1 |
| 2014/0043856 A1* | 2/2014 | Thompson | G02B 6/005 362/613 |
| 2014/0056029 A1* | 2/2014 | He | G02B 6/0011 362/612 |
| 2014/0104689 A1* | 4/2014 | Padiyath | G02B 19/0009 359/592 |
| 2014/0140091 A1* | 5/2014 | Vasylyev | G02B 6/0045 362/606 |
| 2015/0102325 A1* | 4/2015 | Lim | G02B 5/0242 257/40 |
| 2015/0140156 A1* | 5/2015 | Palone | G03F 7/0002 425/385 |
| 2016/0349440 A1* | 12/2016 | Allen | G02B 5/0236 |
| 2018/0217300 A1* | 8/2018 | Boyd | C25D 5/12 |
| 2019/0146139 A1 | 5/2019 | Joo et al. | |
| 2019/0146140 A1 | 5/2019 | Joo et al. | |

FOREIGN PATENT DOCUMENTS

| | | | |
|---|---|---|---|
| CN | 203422542 U | 2/2014 | |
| CN | 105705470 A | 6/2016 | |
| JP | 11339527 A | 12/1999 | |
| JP | 2000036207 A | 2/2000 | |
| WO | 2009051203 A1 | 4/2009 | |
| WO | WO-2009051203 A1 * | 4/2009 | G02B 6/0065 |
| WO | 2015/116743 A1 | 8/2015 | |

OTHER PUBLICATIONS

Jung et al; "Local Dimming Design and Optimization for Edge-Type LED Backlight Unit," SID Symp. Dig. Tech. Papers, 42(1), pp. 1430-1432 (Jun. 2011).
English Translation of CN201780081835.6 Office Action dated May 19, 2020; 19 pages; Chinese Office Patent.
Chinese Patent Application No. 201780081835.6 Second Office Action dated Dec. 18, 2020; 26 pages; (16 pages of English Translation and 10 pages of Original Office Action) Chinese Patent Office.
Yao et al., "Direct Dynamic LCD Backlight Based on LED", Chinese Journal of Liquid Crystals and Displays, vol. 23, No. 4, Aug. 2008, 5 pages.

* cited by examiner

MICROSTRUCTURED AND PATTERNED LIGHT GUIDE PLATES AND DEVICES COMPRISING THE SAME

CROSS-REFERENCE TO RELATED APPLICATIONS

This application is a national stage entry of International Patent Application Serial No. PCT/US2017/066923, filed on Dec. 18, 2017, which in turn, claims the benefit of priority under 35 U.S.C. § 119 of U.S. Provisional Application Ser. No. 62/440,029 filed on Dec. 29, 2016, the contents of each of which are relied upon and incorporated herein by reference in their entireties.

FIELD OF THE DISCLOSURE

The disclosure relates generally to light guide plates and display or lighting devices comprising such light guide plates, and more particularly to glass light guide plates comprising a polymeric film patterned with a plurality of microstructures and/or light extraction features.

BACKGROUND

Liquid crystal displays (LCDs) are commonly used in various electronics, such as cell phones, laptops, electronic tablets, televisions, and computer monitors. However, LCDs can be limited as compared to other display devices in terms of brightness, contrast ratio, efficiency, and viewing angle. For instance, to compete with other display technologies, there is a continuing demand for higher contrast ratio, color gamut, and brightness in conventional LCDs while also balancing power requirements and device size (e.g., thickness).

LCDs can comprise a backlight unit (BLU) for producing light that can then be converted, filtered, and/or polarized to produce the desired image. BLUs may be edge-lit, e.g., comprising a light source coupled to an edge of a light guide plate (LGP), or back-lit, e.g., comprising a two-dimensional array of light sources disposed behind the LCD panel. Direct-lit BLUs may have the advantage of improved dynamic contrast as compared to edge-lit BLUs. For example, a display with a direct-lit BLU can independently adjust the brightness of each LED to optimize the dynamic range of the brightness across the image. This is commonly known as local dimming. However, to achieve desired light uniformity and/or to avoid hot spots in direct-lit BLUs, the light source(s) may be positioned at a distance from the LGP, thus making the overall display thickness greater than that of an edge-lit BLU. In traditional edge-lit BLUs, the light from each LED can spread across a large region of the LGP such that turning off individual LEDs or groups of LEDs may have only a minimal impact on the dynamic contrast ratio.

The local dimming efficiency of an LGP can be enhanced, for example, by providing one or more microstructures on the LGP surface. For instance, plastic LGPs, such as polymethyl methacrylate (PMMA) or methyl methacrylate styrene (MS) LGPs, can be fabricated with surface microstructures, e.g., microlenses, that may confine the light from each LEDs within a narrow band. In this way, it may be possible to adjust the brightness of the light source(s) along the edge of the LGP to enhance the dynamic contrast of the display. If LEDs are mounted on two opposing sides of the LGP, the brightness of pairs of LEDs can be adjusted to produce a brightness gradient along the bands of illumination that may further improve the dynamic contrast.

It may also be advantageous to modify a LGP to improve the uniformity of color and/or intensity of light extracted from the LGP. For instance, at least one surface of the LGP may be modified to include light extraction features that destroy total internal reflection (TIR) in the LGP. In some instances, the density of the light extraction features may increase with distance from the light source. Techniques for surface modification of LGPs to form microstructures and/or light extraction features may include, for example, screen printing, inkjet printing, thermal imprinting, and laser imprinting. Laser imprinting may have certain advantages in terms of pattern control the patterning, e.g., using software, reduced processing time, repeatability, and manufacturing flexibility. Thermal imprinting may also have advantages in terms of improved control over feature shape, repeatability, and mass processing capability.

Glass LGPs may offer various improvements over plastic LGPs, e.g., in terms of their low light attenuation, low coefficient of thermal expansion, and high mechanical strength. As such, it may be desirable to use glass as an alternative material of construction for LGPs in order to overcome various drawbacks associated with plastics. For instance, due to their relatively weak mechanical strength and/or low stiffness, it can be difficult to make plastic LGPs that are both sufficiently large and thin to meet current consumer demands. Plastic LGPs may also necessitate a larger gap between the light source and LGP due to high coefficients of thermal expansion, which can reduce optical coupling efficiency and/or require a larger display bezel. Additionally, plastic LGPs may have a higher propensity to absorb moisture and swell as compared to glass LGPs.

Due to the above-mentioned advantages, many display manufacturers are replacing plastic LGPs with glass LGPs, e.g., to produce thinner displays. However, it may be difficult to process glass LGPs using the same method and/or equipment as that used to process plastic LGPs. For example, while thermal imprinting techniques such as injection molding, extruding, and/or embossing may work well with plastic LGPs, they can be incompatible with glass LGPs due to their higher glass transition temperature and/or higher viscosity. Additionally, while it may be possible to modify a glass substrate with a laser, the stability of the glass may make the laser imprinting process more difficult as compared to the process used for plastic LGPs and different equipment may be needed.

Accordingly, it would be advantageous to provide glass LGPs having improved local dimming efficiency, e.g., glass LGPs with microstructures on at least one surface thereof. Additionally, it would be advantageous to provide glass LGPs having improved light uniformity, e.g., glass LGPs with light extraction features patterned on at least one surface. It would also be advantageous to provide simple and/or cost efficient methods for providing an LGP surface with microstructures and/or light extraction features. It would furthermore be advantageous to provide backlights having a thinness similar to that of edge-lit BLUs while also providing local dimming capabilities similar to that of back-lit BLUs.

SUMMARY

The disclosure relates, in various embodiments, to light guide plates comprising a transparent substrate having an edge surface, a light emitting first major surface, and an opposing second major surface; and a polymeric film disposed on the second major surface of the transparent substrate, wherein the polymeric film comprises a plurality of microstructures patterned with a plurality of light extraction features. Also disclosed herein are light guide plates comprising a glass substrate having an edge surface, a light emitting first major surface, and an opposing second major surface; and a polymeric film disposed on at least one of the first and second major surfaces of the glass substrate, wherein the polymeric film comprises a plurality of light extraction features. Further disclosed herein are light guide assemblies comprising a light guide plate as disclosed herein optically coupled to at least one light source, as well as display, electronic, and lighting devices comprising such light guide plates and assemblies.

In some embodiments, the light guide plate may have a color shift $\Delta y$ of less than about 0.05. According to various embodiments, the transparent substrate may be a glass substrate, for instance, comprising a glass composition including 50-90 mol % $SiO_2$, 0-20 mol % $Al_2O_3$, 0-20 mol % $B_2O_3$, 0-20 mol % $P_2O_5$, 0-25 mol % $R_xO$, where x is 1 or 2 and R is Li, Na, K, Rb, Cs, Zn Mg, Ca, Sr, Ba, and combinations thereof. In additional embodiments, the transparent substrate may comprise less than about 1 ppm each of Co, Ni, and Cr. A thickness of the transparent substrate may range from about 0.1 mm to about 3 mm, whereas a thickness of the polymeric film may range from about 5 μm to about 500 μm.

In certain embodiments, the polymeric film may comprise a UV curable or thermally curable polymer, which may be molded onto the light emitting surface of the glass substrate. In other embodiments, the polymeric film may be laminated to the transparent substrate by an intervening adhesive layer. The polymeric film may, for example, comprise a periodic or non-periodic microstructure array comprising prisms, rounded prisms, or lenticular lenses. An aspect ratio of the microstructures may range, for example, from about 0.1 to about 3. According to non-limiting embodiments, the plurality of light extraction features may have a triangular, trapezoidal, or parabolic cross-sectional profile. The light extraction features may have at least one dimension that is less than about 100 μm.

Further disclosed herein are methods for forming a light guide plate, the methods comprising applying a layer of polymeric material to a major surface of a transparent substrate, and shaping the polymeric material to produce a plurality of microstructures patterned with a plurality of light extraction features. According to various embodiments, the methods may comprise applying the layer of polymeric material to a major surface opposite the light emitting surface of the transparent substrate. In certain embodiments, the layer of polymeric material may be applied by screen printing. Shaping the polymeric material may be carried out, for example, by micro-replication, UV embossing, thermal embossing, or hot embossing. The methods disclosed herein may further comprise one or more steps for forming a shaping mold. The step of shaping the polymeric material may comprise applying the shaping mold to the layer of polymeric material.

Still further disclosed herein are methods for forming a light guide plate, the methods comprising applying a layer of polymeric material to at least one major surface of a glass substrate and modifying the polymeric material to produce a plurality of light extraction features. In non-limiting embodiments, modifying the polymeric material may include thermal and/or laser imprinting the polymeric material.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Light Guide Plates

Disclosed herein are light guide plates comprising a transparent substrate having an edge surface, a light emitting first major surface, and an opposing second major surface; and a polymeric film disposed on the second major surface of the transparent substrate, wherein the polymeric film comprises a plurality of microstructures patterned with a plurality of light extraction features. Also disclosed herein are light guide plates comprising a glass substrate having an edge surface, a light emitting first major surface, and an opposing second major surface; and a polymeric film disposed on at least one of the first and second major surfaces of the glass substrate, wherein the polymeric film comprises a plurality of light extraction features. Further disclosed herein are light guide assemblies comprising a light guide plate as disclosed herein optically coupled to at least one light source. Various devices comprising such light guides are also disclosed herein, such as display, lighting, and electronic devices, e.g., televisions, computers, phones, tablets, and other display panels, luminaires, solid-state lighting, billboards, and other architectural elements, to name a few.

Various embodiments of the disclosure will now be discussed with reference to FIGS. 1-15, which illustrate exemplary embodiments of light guide plates and their methods of manufacture and operation. The following general description is intended to provide an overview of the claimed devices, and various aspects will be more specifically discussed throughout the disclosure with reference to the non-limiting depicted embodiments, these embodiments being interchangeable with one another within the context of the disclosure.

Figure 1A:
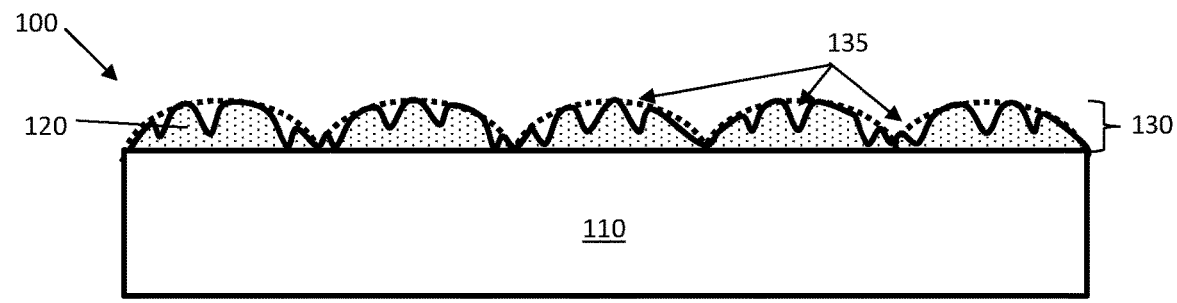
FIGS. 1A-C illustrate exemplary LGPs having surfaces patterned with microstructures and/or light extraction features according to various embodiments of the disclosure.
Figure 1B:
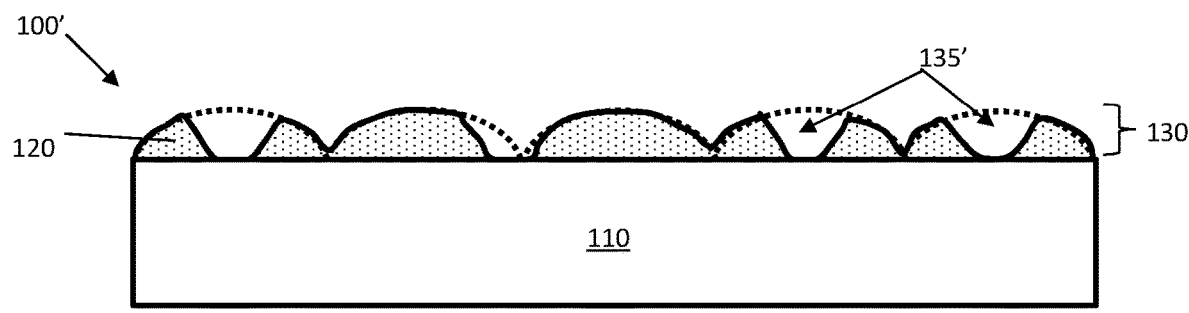
Figure 1C:
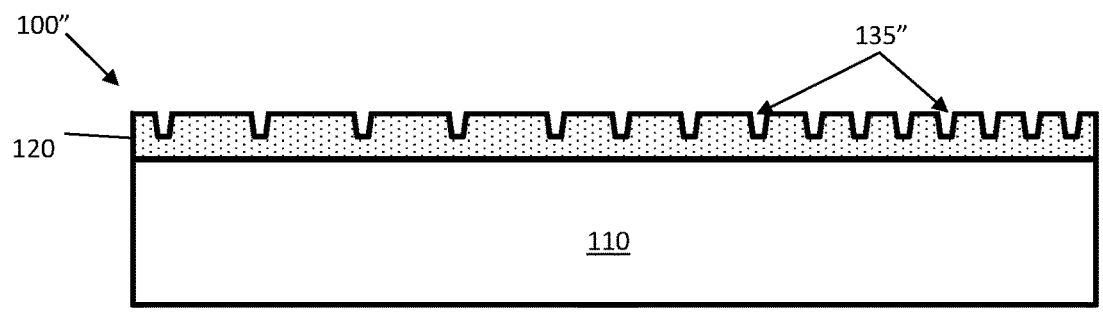

FIGS. 1A-C illustrate exemplary light guide plates (LGPs) 100, 100', 100" comprising a transparent substrate 110 and a polymeric film 120. The polymeric film may comprise a plurality of microstructures 130 as illustrated in FIGS. 1A-B. The polymeric film 120 may also be patterned with light extraction features 135, 135', 135" as illustrated in FIGS. 1A-C. The polymeric film 120 can be present on one or both major surfaces of the transparent substrate and may be identical or different. The light extraction pattern depicted in FIG. 1A may, in certain embodiments, be created using an exemplary method discussed below with respect to FIGS. 8A-D. The light extraction pattern depicted in FIG. 1B may, in various embodiments, be created using an exemplary method discussed below with respect to FIGS. 9A-H. The light extraction pattern depicted in FIG. 1C may, in various embodiments be created using laser and/or thermal imprinting techniques, e.g., as discussed with respect to FIG. 10. Of course, the depicted light extraction patterns are exemplary only and can be modified as appropriate to produce any desired light extraction.

Figure 2:
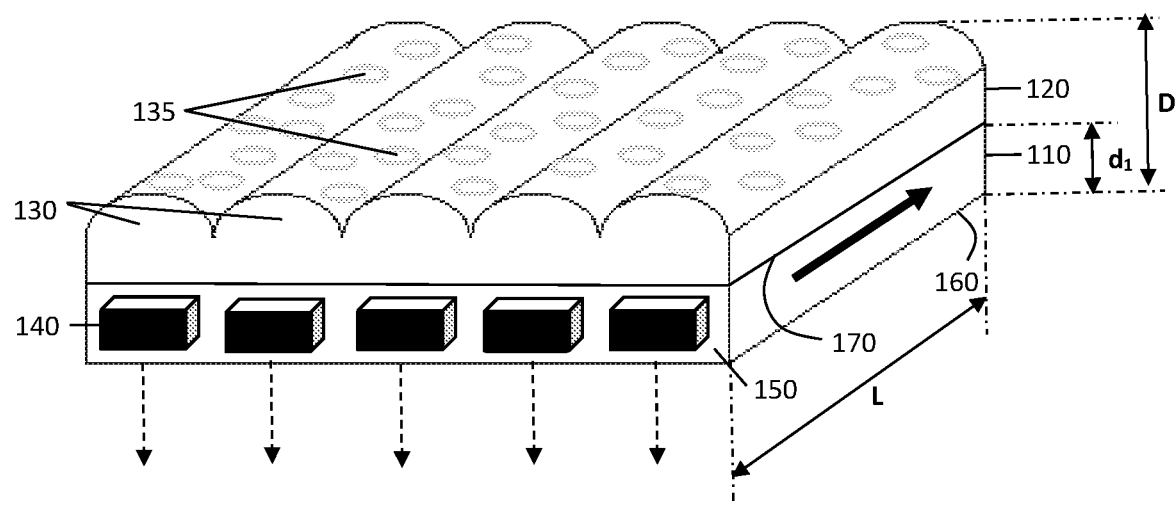
FIG. 2 illustrates a light guide assembly according to certain embodiments of the disclosure.

As shown in FIG. 2, at least one light source 140 can be optically coupled to an edge surface 150 of transparent substrate 110, e.g., positioned adjacent to the edge surface 150. As used herein, the term "optically coupled" is intended to denote that a light source is positioned at an edge of the LGP so as to introduce light into the LGP. A light source may be optically coupled to the LGP even though it is not in physical contact with the LGP. Additional light sources (not illustrated) may also be optically coupled to other edge surfaces of the LGP, such as adjacent or opposing edge surfaces. While FIG. 2 illustrates a LGP having a microstructured polymeric film, it is to be understood that LGPs having any configuration, such as those illustrated in FIGS. 1A-C, and any variations thereon, may be coupled to light source 140.

A general direction of light emission from light source 140 is depicted in FIG. 2 by the solid arrow. Light injected into the LGP may propagate along a length L of the LGP due to total internal reflection (TIR), until it strikes an interface at an angle of incidence that is less than the critical angle. Total internal reflection (TIR) is the phenomenon by which light propagating in a first material (e.g., glass, plastic, etc.) comprising a first refractive index can be totally reflected at the interface with a second material (e.g., air, etc.) comprising a second refractive index lower than the first refractive index. TIR can be explained using Snell's law:

$$n_1 \sin(\theta_i) = n_2 \sin(\theta_r)$$

which describes the refraction of light at an interface between two materials of differing indices of refraction. In accordance with Snell's law, $n_1$ is the refractive index of a first material, $n_2$ is the refractive index of a second material, $\theta_i$ is the angle of the light incident at the interface relative to a normal to the interface (incident angle), and $\theta_r$ is the angle of refraction of the refracted light relative to the normal. When the angle of refraction ($\theta_r$) is 90°, e.g., $\sin(\theta_r)=1$, Snell's law can be expressed as:

$$\theta_c = \theta_i = \sin^{-1}\left(\frac{n_2}{n_1}\right)$$

The incident angle $\theta_i$ under these conditions may also be referred to as the critical angle $\theta_c$. Light having an incident angle greater than the critical angle ($\theta_i > \theta_c$) will be totally internally reflected within the first material, whereas light with an incident angle equal to or less than the critical angle ($\theta_i \leq \theta_c$) will be transmitted by the first material.

In the case of an exemplary interface between air ($n_1=1$) and glass ($n_2=1.5$), the critical angle ($\theta_c$) can be calculated as 42°. Thus, if light propagating in the glass strikes the air-glass interface at an incident angle greater than 42°, all the incident light will be reflected from the interface at an angle equal to the incident angle. If the reflected light encounters a second interface comprising an identical refractive index relationship as the first interface, the light incident on the second interface will again be reflected at a reflection angle equal to the incident angle.

Polymeric film 120 may be disposed on a major surface of the transparent substrate 110, such as the light emitting (first) surface 160, the (second) major surface 170 opposite the light emitting surface 160, or both. In some embodiments, the polymeric film 120 may be disposed on the second major surface 170. As used herein, the term "disposed on" and variations thereof is intended to denote that a component or layer is located on a particular surface of a listed component, but not necessarily in direct physical contact with that surface. For instance, the polymeric film 120 is depicted in FIG. 2 in direct physical contact with light emitting surface 160 of transparent substrate 110; however, in some embodiments, other layers or films (e.g., adhesives) may be present between these two components. As such, a component A disposed on a surface of component B may or may not be in direct physical contact with component B.

The array of microstructures 130 may, along with light extraction features 135, 135', 135" and/or other optional components of the LGP, direct the transmission of light in a forward direction (e.g., toward a user), as indicated by the dashed arrows. In some embodiments, light source 140 may be a Lambertian light source, such as a light emitting diode (LED). Light from the LEDs may spread quickly within the LGP, which can make it challenging to effect local dimming (e.g., by turning off one or more LEDs). However, by providing one or more microstructures on a surface of the LGP that are elongated in the direction of light propagation (as indicated by the solid arrow in FIG. 2), it may be possible to limit the spreading of light such that each LED source effectively illuminates only a narrow strip of the LGP. The illuminated strip may extend, for example, from the point of origin at the LED to a similar end point on the opposing edge. As such, using various microstructure configurations, it may be possible to effect 1D local dimming of at least a portion of the LGP in a relatively efficient manner.

In certain embodiments, the light guide assembly can be configured such that it is possible to achieve 2D local dimming. For instance, one or more additional light sources can be optically coupled to an adjacent (e.g., orthogonal) edge surface. A first polymeric film may be arranged on the light emitting surface 160, this film having microstructures extending in a propagation direction, and a second polymeric film may be arranged on the opposing major surface 170, this film having microstructures extending in a direction orthogonal to the propagation direction. Thus, 2D local dimming may be achieved by selectively shutting off one or more of the light sources along each edge surface.

While not illustrated in FIG. 2, the light emitting surface 160 of the transparent substrate 110 may be patterned with a plurality of light extraction features and/or provided with a microstructured surface. For instance, the light extraction features may be distributed across the light emitting surface 160, e.g. as textural features making up a roughened or raised surface, or may be distributed within and throughout the substrate or portions thereof, e.g., as laser-damaged features. Suitable methods for creating such light extraction features can include printing, such as inkjet printing, screen printing, microprinting, and the like, texturing, mechanical roughening, etching, injection molding, coating, laser damaging, or any combination thereof. Non-limiting examples of such methods include, for instance, acid etching a surface, coating a surface with $TiO_2$, and laser damaging the substrate by focusing a laser on a surface or within the substrate matrix. In additional embodiments, the light emitting surface 160 may comprise a second polymeric film 120, which can be provided with microstructures and/or light extraction features according to any method disclosed herein.

In various embodiments, the light extraction features 135, 135', 135" may comprise light scattering sites. According to various embodiments, the extraction features may be patterned in a suitable density so as to produce substantially uniform light output intensity across the light emitting surface of the transparent substrate. In certain embodiments, a density of the light extraction features proximate the light source may be lower than a density of the light extraction features at a point further removed from the light source, or vice versa, such as a gradient from one end to another, as appropriate to create the desired light output distribution across the LGP.

Figure 12A:
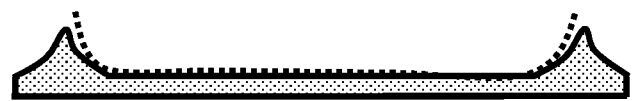
FIGS. 12A-C illustrate cross-sectional views of light extraction features formed according to certain embodiments of the disclosure.
Figure 12B:
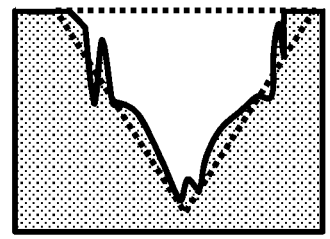
Figure 12C:
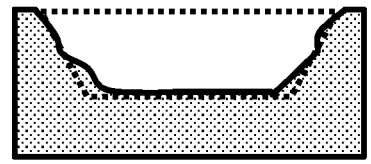

Light extraction features 135, 135', 136" may have any cross-sectional profile, including the non-limiting profiles illustrated in FIGS. 12A-C, discussed in more detail below. In various embodiments, light extraction features 135, 135', 135" can comprise at least one dimension (e.g., width, height, length, etc.) that is less than about 100 microns (μm), such as less than about 75 μm, less than about 50 μm, less than about 25 μm, less than about 10 μm, or even less, including all ranges and subranges therebetween, e.g., ranging from about 1 μm to about 100 μm.

The polymeric film 120 may be simultaneously treated to create microstructures light extraction features according to the exemplary methods discussed below with respect to FIGS. 8-9. Alternatively, the polymeric film may first be treated to create microstructures, e.g., by embossing, and subsequently treated to create light extraction features, e.g., by laser imprinting. In still further embodiments, the polymeric film may not comprise microstructures and may be treated to create light extraction features, e.g., by laser and/or thermal imprinting.

Additional light extraction features (not depicted) may be formed on either major surface of the transparent substrate 110 using any method known in the art, e.g., the methods disclosed in co-pending and co-owned International Patent Application Nos. PCT/US2013/063622 and PCT/US2014/070771, each incorporated herein by reference in their entirety. For example, the light emitting surface 160 and/or major surface 170 may be ground and/or polished to achieve the desired thickness and/or surface quality. The surface may then be optionally cleaned and/or the surface to be etched may be subjected to a process for removing contamination, such as exposing the surface to ozone. The surface to be etched may, by way of a non-limiting embodiment, be exposed to an acid bath, e.g., a mixture of glacial acetic acid (GAA) and ammonium fluoride ($NH_4F$) in a ratio, e.g., ranging from about 1:1 to about 9:1. The etching time may range, for example, from about 30 seconds to about 15 minutes, and the etching may take place at room temperature or at elevated temperature. Process parameters such as acid concentration/ratio, temperature, and/or time may affect the size, shape, and distribution of the resulting extraction features. It is within the ability of one skilled in the art to vary these parameters to achieve the desired surface extraction features.

The transparent substrate 110 can have any desired size and/or shape as appropriate to produce a desired light distribution. The major surfaces 160, 170 of substrate 110 may, in certain embodiments, be planar or substantially planar and/or parallel. The first and second major surfaces may also, in various embodiments, have a radius of curvature along at least one axis. The transparent substrate 110 may comprise four edges as illustrated in FIG. 2, or may comprise more than four edges, e.g. a multi-sided polygon. In other embodiments, the transparent substrate 110 may comprise less than four edges, e.g., a triangle. By way of a non-limiting example, the light guide may comprise a rectangular, square, or rhomboid sheet having four edges, although other shapes and configurations are intended to fall within the scope of the disclosure including those having one or more curvilinear portions or edges.

In certain embodiments, the transparent substrate 110 may have a thickness $d_1$ of less than or equal to about 3 mm, for example, ranging from about 0.1 mm to about 2.5 mm, from about 0.3 mm to about 2 mm, from about 0.5 mm to about 1.5 mm, or from about 0.7 mm to about 1 mm, including all ranges and subranges therebetween. The transparent substrate 110 can comprise any material known in the art for use in display devices, including plastic and glass materials. Exemplary plastic materials include, but are not limited to, polymethyl methacrylate (PMMA) or methyl methacrylate styrene (MS). Glass materials may include, for instance, aluminosilicate, alkali-aluminosilicate, borosilicate, alkali-borosilicate, aluminoborosilicate, alkali-aluminoborosilicate, soda lime, or other suitable glasses. Non-limiting examples of commercially available glasses suitable for use as a glass light guide include, for instance, EAGLE XG®, Lotus™, Willow®, Iris™, and Gorilla® glasses from Corning Incorporated.

Some non-limiting glass compositions can include between about 50 mol % to about 90 mol % $SiO_2$, between 0 mol % to about 20 mol % $Al_2O_3$, between 0 mol % to about 20 mol % $B_2O_3$, between 0 mol % to about 20 mol % $P_2O_5$, and between 0 mol % to about 25 mol % $R_xO$, wherein R is any one or more of Li, Na, K, Rb, Cs and x is 2, or Zn, Mg, Ca, Sr or Ba and x is 1. In some embodiments, $R_xO$—$Al_2O_3$>0; 0<$R_xO$—$Al_2O_3$<15; x=2 and $R_2O$—$Al_2O_3$<15; $R_2O$—$Al_2O_3$<2; x=2 and $R_2O$—$Al_2O_3$—MgO>−15; 0<($R_xO$—$Al_2O_3$)<25, −11<($R_2O$—$Al_2O_3$)<11, and −15<($R_2O$—$Al_2O_3$—MgO)<11; and/or −1<($R_2O$—$Al_2O_3$)<2 and −6<($R_2O$—$Al_2O_3$—MgO)<1. In some embodiments, the glass comprises less than 1 ppm each of Co, Ni, and Cr. In some embodiments, the concentration of Fe is <about 50 ppm, <about 20 ppm, or <about 10 ppm. In other embodiments, Fe+30Cr+35Ni<about 60 ppm, Fe+30Cr+35Ni<about 40 ppm, Fe+30Cr+35Ni<about 20 ppm, or Fe+30Cr+35Ni<about 10 ppm. In other embodiments, the glass comprises between about 60 mol % to about 80 mol % $SiO_2$, between about 0.1 mol % to about 15 mol % $Al_2O_3$, 0 mol % to about 12 mol % $B_2O_3$, and about 0.1 mol % to about 15 mol % $R_2O$ and about 0.1 mol % to about 15 mol % RO, wherein R is any one or more of Li, Na, K, Rb, Cs and x is 2, or Zn, Mg, Ca, Sr or Ba and x is 1.

In other embodiments, the glass composition can comprise between about 65.79 mol % to about 78.17 mol % $SiO_2$, between about 2.94 mol % to about 12.12 mol % $Al_2O_3$, between about 0 mol % to about 11.16 mol % $B_2O_3$, between about 0 mol % to about 2.06 mol % $Li_2O$, between about 3.52 mol % to about 13.25 mol % $Na_2O$, between about 0 mol % to about 4.83 mol % $K_2O$, between about 0 mol % to about 3.01 mol % ZnO, between about 0 mol % to about 8.72 mol % MgO, between about 0 mol % to about 4.24 mol % CaO, between about 0 mol % to about 6.17 mol % SrO, between about 0 mol % to about 4.3 mol % BaO, and between about 0.07 mol % to about 0.11 mol % $SnO_2$.

In additional embodiments, the transparent substrate 110 can comprise glass having an $R_xO/Al_2O_3$ ratio between 0.95 and 3.23, wherein R is any one or more of Li, Na, K, Rb, Cs and x is 2. In further embodiments, the glass may comprise an $R_xO/Al_2O_3$ ratio between 1.18 and 5.68, wherein R is any one or more of Li, Na, K, Rb, Cs and x is 2, or Zn, Mg, Ca, Sr or Ba and x is 1. In yet further embodiments, the glass can comprise an $R_xO$—$Al_2O_3$—MgO between −4.25 and 4.0, wherein R is any one or more of Li, Na, K, Rb, Cs and x is 2. In still further embodiments, the glass may comprise between about 66 mol % to about 78 mol % $SiO_2$, between about 4 mol % to about 11 mol % $Al_2O_3$, between about 4 mol % to about 11 mol % $B_2O_3$, between about 0 mol % to about 2 mol % $Li_2O$, between about 4 mol % to about 12 mol % $Na_2O$, between about 0 mol % to about 2 mol % $K_2O$, between about 0 mol % to about 2 mol % ZnO, between about 0 mol % to about 5 mol % MgO, between about 0 mol % to about 2 mol % CaO, between about 0 mol % to about 5 mol % SrO, between about 0 mol % to about 2 mol % BaO, and between about 0 mol % to about 2 mol % $SnO_2$.

In additional embodiments, the transparent substrate 110 can comprise a glass material including between about 72 mol % to about 80 mol % $SiO_2$, between about 3 mol % to about 7 mol % $Al_2O_3$, between about 0 mol % to about 2 mol % $B_2O_3$, between about 0 mol % to about 2 mol % $Li_2O$, between about 6 mol % to about 15 mol % $Na_2O$, between about 0 mol % to about 2 mol % $K_2O$, between about 0 mol % to about 2 mol % ZnO, between about 2 mol % to about 10 mol % MgO, between about 0 mol % to about 2 mol % CaO, between about 0 mol % to about 2 mol % SrO, between about 0 mol % to about 2 mol % BaO, and between about 0 mol % to about 2 mol % $SnO_2$. In certain embodiments, the glass can comprise between about 60 mol % to about 80 mol % $SiO_2$, between about 0 mol % to about 15 mol % $Al_2O_3$, between about 0 mol % to about 15 mol % $B_2O_3$, and about 2 mol % to about 50 mol % $R_xO$, wherein R is any one or more of Li, Na, K, Rb, Cs and x is 2, or Zn, Mg, Ca, Sr or Ba and x is 1, and wherein Fe+30Cr+35Ni<about 60 ppm.

In some embodiments, the transparent substrate 110 can comprise a color shift Δy less than 0.05, such as ranging from about −0.005 to about 0.05, or ranging from about 0.005 to about 0.015 (e.g., about −0.005, −0.004, −0.003, −0.002, −0.001, 0, 0.001, 0.002, 0.003, 0.004, 0.005, 0.006, 0.007, 0.008, 0.009, 0.010, 0.011, 0.012, 0.013, 0.014, 0.015, 0.02, 0.03, 0.04, or 0.05). In other embodiments, the transparent substrate can comprise a color shift less than 0.008. According to certain embodiments, the transparent substrate can have a light attenuation $α_1$ (e.g., due to absorption and/or scattering losses) of less than about 4 dB/m, such as less than about 3 dB/m, less than about 2 dB/m, less than about 1 dB/m, less than about 0.5 dB/m, less than about 0.2 dB/m, or even less, e.g., ranging from about 0.2 dB/m to about 4 dB/m, for wavelengths ranging from about 420-750 nm.

Attenuation may be characterized by measuring light transmission $T_L(λ)$ of an input source through a transparent substrate of length L and normalizing this transmission by the source spectrum $T_0(λ)$. In units of dB/m the attenuation is given by $α(λ)=−10/L*\log_{10}(T_L(λ)/T_L(λ))$ where L is the length in meters and $T_L(λ)$ and $T_L(λ)$ are measured in radiometric units.

The transparent substrate 110 may, in some embodiments, comprise glass that is chemically strengthened, e.g., by ion exchange. During the ion exchange process, ions within a glass sheet at or near the surface of the glass sheet may be exchanged for larger metal ions, for example, from a salt bath. The incorporation of the larger ions into the glass can strengthen the sheet by creating a compressive stress in a near surface region. A corresponding tensile stress can be induced within a central region of the glass sheet to balance the compressive stress.

Ion exchange may be carried out, for example, by immersing the glass in a molten salt bath for a predetermined period of time. Exemplary salt baths include, but are not limited to, $KNO_3$, $LiNO_3$, $NaNO_3$, $RbNO_3$, and combinations thereof. The temperature of the molten salt bath and treatment time period can vary. It is within the ability of one skilled in the art to determine the time and temperature according to the desired application. By way of a non-limiting example, the temperature of the molten salt bath may range from about 400° C. to about 800° C., such as from about 400° C. to about 500° C., and the predetermined time period may range from about 4 to about 24 hours, such as from about 4 hours to about 10 hours, although other temperature and time combinations are envisioned. By way of a non-limiting example, the glass can be submerged in a $KNO_3$ bath, for example, at about 450° C. for about 6 hours to obtain a K-enriched layer which imparts a surface compressive stress.

The polymeric film 120 can comprise any polymeric material capable of being UV or thermally cured. Exemplary polymeric materials may include, for example, polyacrylate, polyolefin, polycarbonate, poly(cyclicolefin), polysulfone, polyethylene terephthalate (PET), glycol-modified PET (PETG), and other like polymers. The polymeric material may further be chosen from compositions having a low color shift and/or low absorption of blue light wavelengths (e.g., ~450-500 nm), as discussed in more detail below. In certain embodiments, the polymeric film 120 may be deposited on a major surface 170 of the substrate and molded or otherwise processed to create microstructures 130 and/or light extraction features 135, 135', 135". Depositing the polymeric film may comprise, in some embodiments, laminating a polymeric film to the substrate using an intervening adhesive layer or applying a liquid or low viscosity resin to the substrate followed by curing. The polymeric film 120 may be continuous or discontinuous.

The adhesive layer, if present, may include any adhesive known in the art, e.g., optically clear adhesives (OCAs), such as those sold by 3M, and ionomer polymers, such as those sold by DuPont. Exemplary thicknesses for the adhesive layer can include, for example, a thickness ranging from about 10 μm to about 500 μm, from about 25 μm to about 400 μm, from about 50 μm to about 300 μm, or from about 100 μm to about 200 μm, including all ranges and subranges therebetween.

Figure 3A:
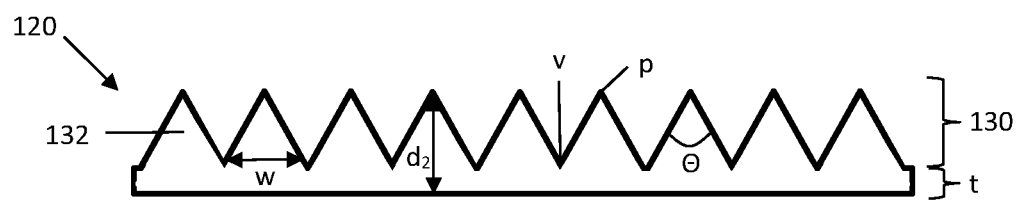
FIGS. 3A-D illustrate exemplary microstructure profiles.
Figure 3B:
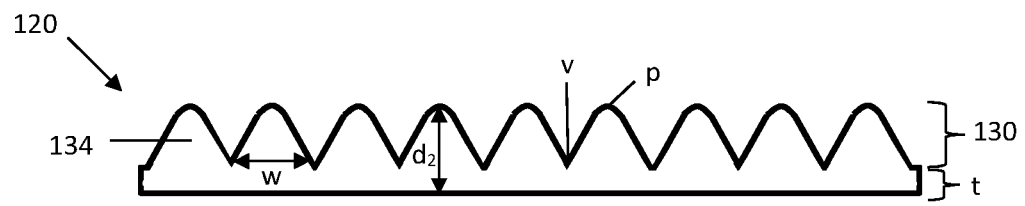
Figure 3C:
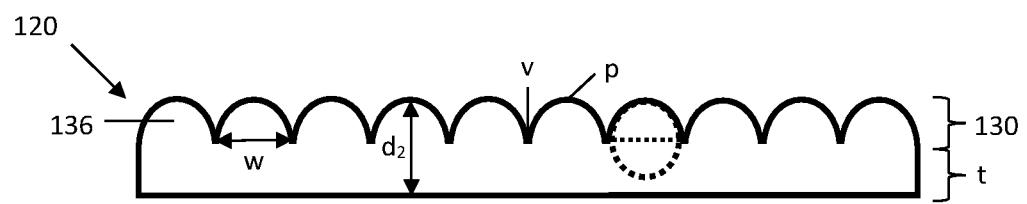
Figure 3D:
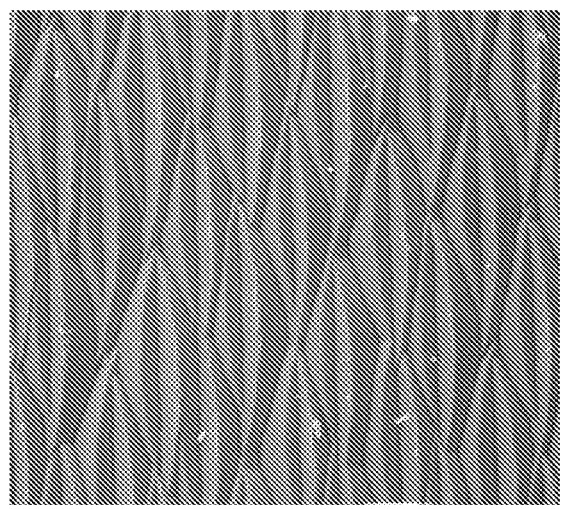

While FIGS. 1-2 illustrate microstructures 130 having a lenticular profile, polymeric film 120 can comprise any other suitable microstructures 130, which can similarly be patterned with light extraction features 135, 135', 135". For instance, FIGS. 3A-B illustrate microstructures 130 comprising prisms 132 and rounded prisms 134, respectively. As shown in FIG. 3C, the microstructures 130 may also comprise lenticular lenses 136 (see also FIGS. 1-2). Of course, the depicted microstructures are exemplary only and are not intended to limit the appending claims. Other microstructure shapes are possible and intended to fall within the scope of the disclosure. Furthermore, while FIGS. 3A-C illustrate regular (or periodic) arrays, it is also possible to use an irregular (or non-periodic) array. For instance, FIG. 3D is an SEM image of a microstructured surface comprising a non-periodic array of prisms.

As used herein, the term "microstructures," "microstructured," and variations thereof is intended to refer to surface relief features of the polymeric film extending in a given direction (e.g., parallel or orthogonal to a direction of light propagation) and having at least one dimension (e.g., height, width, length, etc.) that is less than about 500 μm, such as less than about 400 μm, less than about 300 μm, less than about 200 μm, less than about 100 μm, less than about 50 μm, or even less, e.g., ranging from about 10 μm to about 500 μm, including all ranges and subranges therebetween. The microstructures may, in certain embodiments, have regular or irregular shapes, which can be identical or different within a given array. While FIGS. 3A-D generally illustrate microstructures 130 of the same size and shape, which are evenly spaced apart at substantially the same pitch, it is to be understood that not all microstructures within a given array must have the same size and/or shape and/or spacing. Combinations of microstructure shapes and/or sizes may be used, and such combinations may be arranged in a periodic or non-periodic fashion.

Moreover, the size and/or shape of the microstructures 130 can vary depending on the desired light output and/or optical functionality of the LGP. For instance, different microstructure shapes may result in different local dimming efficiencies, also referred to as the local dimming index (LDI). The local dimming index may be determined, for example, using the methods set forth in Jung et al., "Local dimming design and optimization for edge-type LED backlight unit," SID Symp. Dig. Tech. Papers, 42(1), pp. 1430-1432 (June 2011). By way of non-limiting example, a periodic array of prism microstructures may result in an LDI value up to about 70%, whereas a periodic array of lenticular lenses may result in an LDI value up to about 83%. Of course, the microstructure size and/or shape and/or spacing may be varied to achieve different LDI values. Different microstructure shapes may also provide additional optical functionalities. For instance, a prism array having a 90° prism angle may not only result in more efficient local dimming, but may also partially focus the light in a direction perpendicular to the prismatic ridges due to recycling and redirecting of the light rays.

With reference to FIG. 3A, the prism microstructures 132 can have a prism angle θ ranging from about 60° to about 120°, such as from about 70° to about 110°, from about 80° to about 100°, or about 90°, including all ranges and subranges therebetween. Referring to FIG. 3C, the lenticular microstructures 136 can have any given cross-sectional shape (as illustrated by the dashed lines), ranging from semi-circular, semi-elliptical, parabolic, or other similar rounded shapes. It should be noted that light extraction features are not illustrated in FIGS. 3A-C for purposes of simplified illustration, but such features may be present in non-limiting embodiments.

The polymeric film 120 may have an overall thickness $d_2$ and a "land" thickness t. The microstructures 130 may comprise peaks p and valleys v, and the overall thickness may correspond to the height of the peaks p, whereas the land thickness may correspond to the height of the valleys v. According to various embodiments, it may be advantageous to deposit the polymeric film 120 such that the land thickness t is zero or as close to zero as possible. When t is zero, the polymeric film 120 may be discontinuous. For instance, the land thickness t may range from 0 to about 250 μm, such as from about 10 μm to about 200 μm, from about 20 μm to about 150 μm, or from about 50 μm to about 100 μm, including all ranges and subranges therebetween. In additional embodiments, the overall thickness $d_2$ may range from about 5 μm to about 500 μm, such as from about 10 μm to about 400 μm, from about 20 μm to about 300 μm, from about 30 μm to about 200 μm, from about 40 μm to about 150 μm, or from about 50 μm to about 100 μm, including all ranges and subranges therebetween.

With continued reference to FIGS. 3A-C, the microstructures 130 may also have a width w, which can be varied as appropriate to achieve a desired aspect ratio. Variation of the land thickness t and overall thickness $d_2$ can also be used to modify the light output. In non-limiting embodiments, the aspect ratio (w/[$d_2$-t]) of the microstructures 130 can range from about 0.1 to about 3, such as from about 0.5 to about 2.5, from about 1 to about 2.2, or from about 1.5 to about 2, including all ranges and subranges therebetween. According to some embodiments, the aspect ratio can range from about 2 to about 3, e.g., about 2, 2.1, 2.2, 2.3, 2.4, 2.5, 2.6, 2.7, 2.8, 2.9, or 3, including all ranges and subranges therebetween. The width w of the microstructures can also range, for example, from about 1 μm to about 250 μm, such as from about 10 μm to about 200 μm, from about 20 μm to about 150 μm, or from about 50 μm to about 100 μm, including all ranges and subranges therebetween. It should also be noted that the microstructures 130 may have a length (not labeled) extending in the direction of light propagation (see solid arrow in FIG. 2), which can vary as desired, e.g., depending on the length L of the transparent substrate 110. According to various embodiments, the microstructures may have one or more discontinuities along this length.

The polymeric film 120 may, in certain embodiments, comprise a material that does not exhibit a noticeable color shift over visible wavelengths. Several plastics and resins may have a tendency to develop a yellow tint over time due to light absorption of blue wavelengths (e.g., ~450-500 nm). This discoloration may worsen at elevated temperatures, for instance, within normal BLU operating temperatures. Moreover, BLUs incorporating LED light sources may exacerbate the color shift due to significant emission of blue wavelengths. In particular, LEDs may be used to deliver white light by coating a blue-emitting LED with a color converting material (such as phosphors, etc.) that converts some of the blue light to red and green wavelengths, resulting in the overall perception of white light. However, despite this color conversion, the LED emission spectrum may still have a strong emission peak in the blue region. If the polymeric film absorbs the blue light, it may be converted to heat, thereby further accelerating polymer degradation and further increasing blue light absorption over time.

While absorption of blue light by the polymeric film may be negligible when light propagates perpendicular to the film, it may become more significant when light propagates along the length of the film (as in the case of an edge-lit LGP), due to the longer propagation length. Blue light absorption along the length of the LGP may result in a noticeable loss of blue light intensity and, thus, a noticeable change of color (e.g., a yellow color shift) along the propagation direction. As such, a color shift may be perceived by the human eye from one edge of the display to the other. It may therefore be advantageous to select a polymeric film material that has comparable absorption values for different wavelengths within the visible range (e.g., ~420-750 nm). For instance, the absorption at blue wavelengths may be substantially similar to the absorption at red wavelengths, and so forth.

Figure 4:
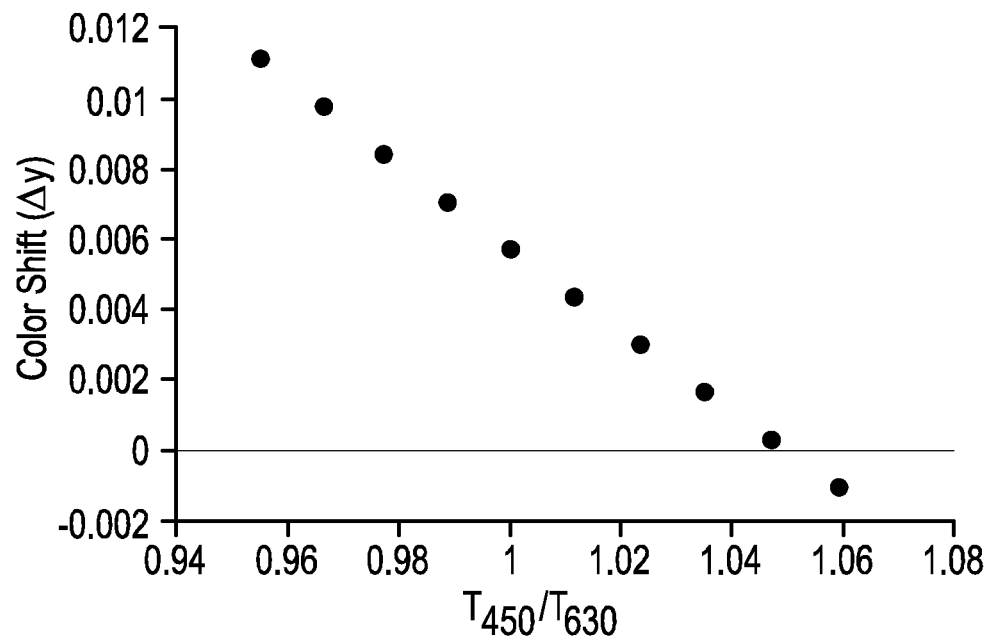
FIG. 4 is a graphical depiction of color shift $\Delta y$ as a function of the ratio of blue to red transmission for a light guide plate.
Figure 5:
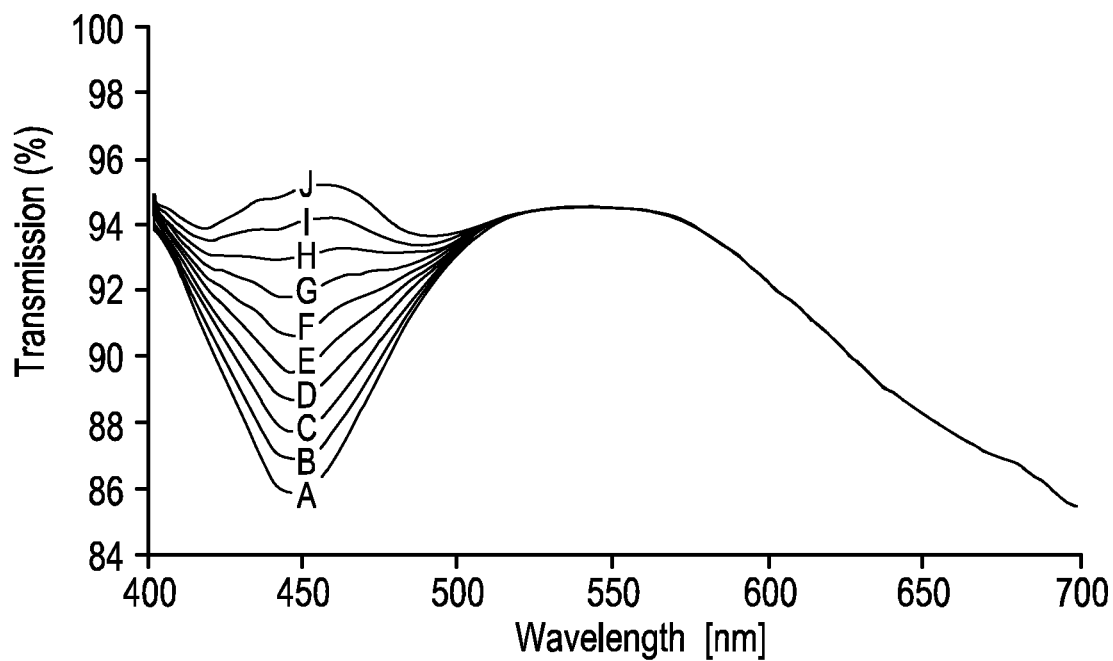
FIG. 5 is a graphical depiction of transmission curves for various LGPs.

FIG. 4 demonstrates the impact of the blue/red transmission ratio on color shift for an exemplary LGP. As demonstrated by the plot, color shift Δy increases in a nearly linear fashion as blue (450 nm) transmission decreases relative to red (630 nm) transmission. As blue transmission approaches a value similar to that of red transmission (e.g., as the ratio approaches 1), the color shift Δy similarly approaches 0. FIG. 5 illustrates the transmission spectra used to produce the correlation presented in FIG. 4. Table I below provides relevant details for transmission curves A-J.

TABLE I

Transmission Curves

| | Absorption Peak Shift (ΔA) | Color Shift (Δy) |
|---|---|---|
| A | 0.5 | 0.0111 |
| B | 0.4 | 0.0098 |
| C | 0.3 | 0.0084 |
| D | 0.2 | 0.0071 |
| E | 0.1 | 0.0057 |
| F | 0.0 | 0.0044 |
| G | −0.1 | 0.003 |
| H | −0.2 | 0.0017 |
| I | −0.3 | 0.0003 |
| J | −0.4 | −0.001 |

Because the polymeric film may comprise only a small portion of the overall thickness of the LGP, the blue/red transmission ratio can be somewhat lower than that show in FIG. 4 (due to the relative thinness of the film) without dramatically impacting color shift performance of the overall LGP. However, it may still be desirable to reduce absorption of blue light and/or to provide a more homogenous absorption profile across the visible wavelength spectrum. In some embodiments, the polymeric film may be selected to avoid chromophores that absorb at wavelengths>400 nm, such as >430 nm, or >450 nm. In certain embodiments, the polymeric film may be chosen such that the concentration of blue light absorbing chromophores is less than about 5 ppm, such as less than about 1 ppm, less than about 0.5 ppm, or less than about 0.1 ppm, including all ranges and subranges therebetween. Alternatively, the polymeric film may be modified to compensate for blue light absorption, e.g. by incorporating one or more dyes, pigments, and/or optical brighteners, that absorb at yellow wavelengths (e.g., ~570-590 nm) to neutralize any potential color shift. However, engineering the polymeric material to absorb both at blue and yellow wavelengths may lower the overall transmissivity of the film and, thus, the overall transmissivity of the LGP. As such, in certain embodiments, it may be advantageous to instead select and/or modify a polymeric material to reduce blue light absorption and thereby increase the overall transmissivity of the film. In some embodiments, the materials for the transparent substrate and the polymeric films may be chosen to have complementary optical absorption profiles, e.g., the optical absorption of the glass substrate may balance or offset the optical absorption of the polymeric film at a given wavelength, e.g., blue wavelengths, such that the overall LGP does not exhibit any color shift.

Figure 6:
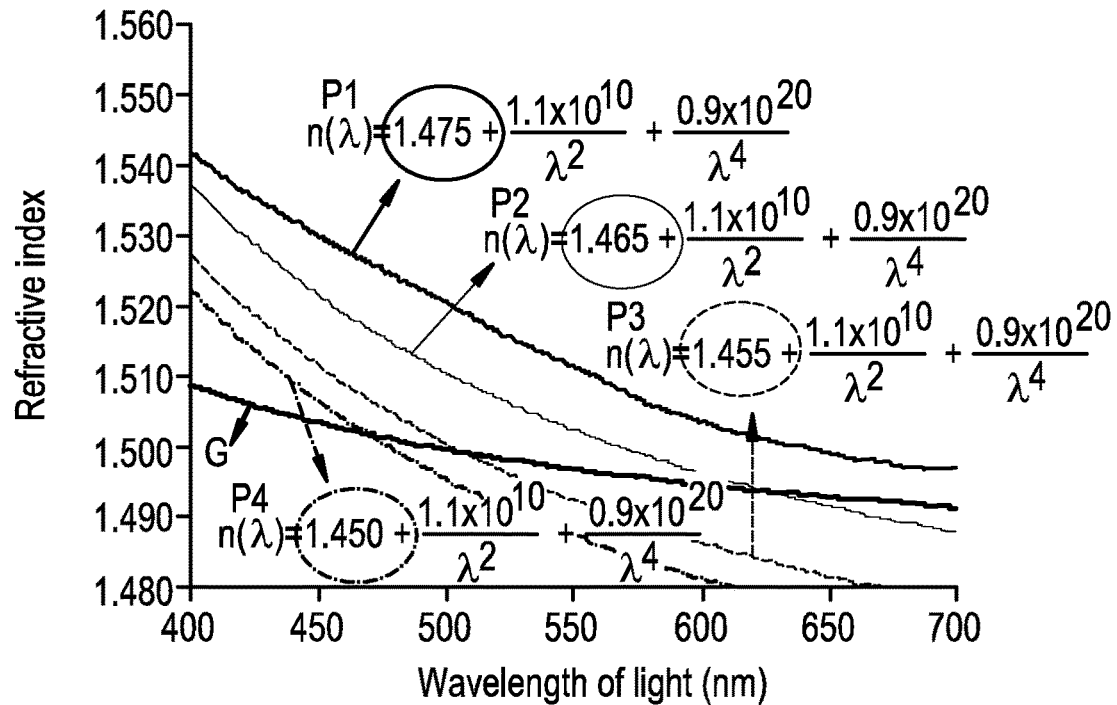
FIG. 6 is a graphical depiction of refractive index dispersion for glass and polymeric materials.

According to various embodiments, the polymeric film 120 may also be chosen to have a refractive index dispersion that balances interfacial Fresnel reflections in the blue and red spectral regions to minimize color shift along the length of the LGP. As shown in FIG. 6, a glass substrate (G) may have a substantially different refractive index dispersion as compared to polymeric materials (P1-P4). The refractive index dispersion n(λ) for a given material may be modeled using the formula:

$$n(\lambda) = A + \frac{B}{\lambda^2} + \frac{C}{\lambda^4}$$

where λ is a given wavelength, A is the Cauchy constant, and B and C are coefficients determined for a given material by fitting the equation to measured refractive indices at known wavelengths.

The mismatch between refractive indices at a given wavelength may produce Fresnel reflections at the glass-polymer interface of the LGP. The refractive index mismatch may, in certain embodiments, be tuned such that the wavelength dependent Fresnel reflection coefficients of the individual layers minimize the net change in the blue/red ratio of light propagating along the length of the LGP. For instance, if the blue reflection coefficient is significantly higher than the red reflection coefficient, then the blue light may be more strongly confined to the glass substrate and will be less likely to get extracted by the light extraction features.

Figure 7:
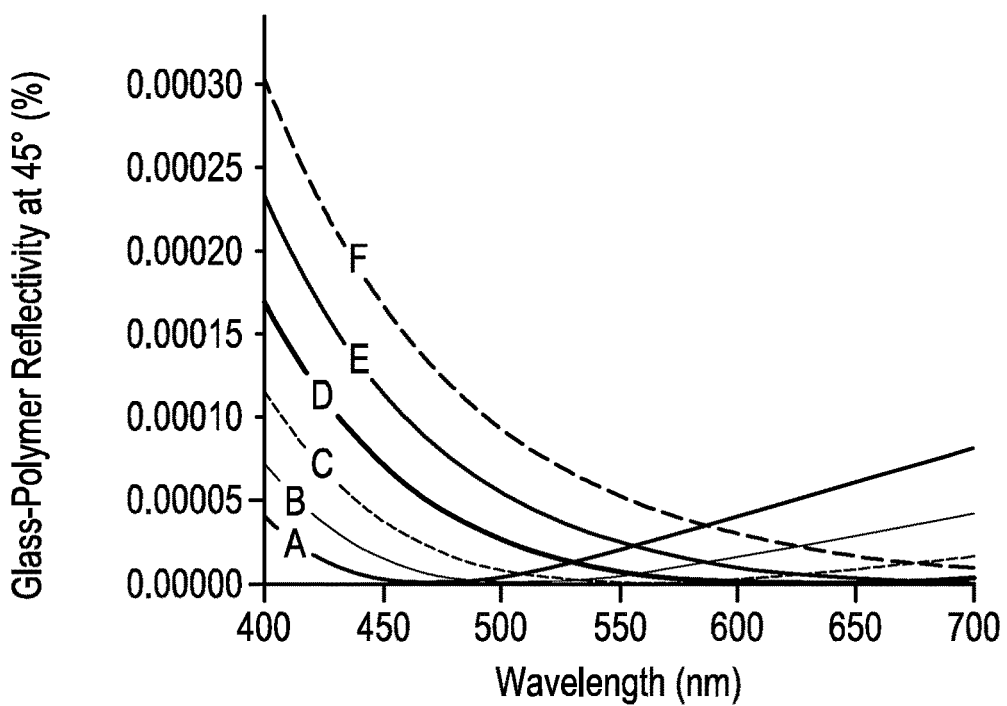
FIG. 7 is a graphical depiction of Fresnel reflectivity for glass substrates with different polymeric layers.

FIG. 7 illustrates a simplified Fresnel analysis for a glass substrate with polymer layers having different Cauchy constants (A) and a range of refractive indices. FIG. 7 demonstrates that balancing the Fresnel reflectivity at the glass-polymer interface across the wavelength range of interest can minimize overall color shift. If the reflectivity is balanced between the blue and red then the color of the LGP will be maintained as the light bounces repeatedly along the LGP's length. However, if blue light couples more efficiently into the ink binder than red light, then the blue light will eventually be depleted in the LGP and cause a yellow color shift. In some embodiments, the LGP may have balanced interfacial Fresnel reflections at 450 nm (blue) and 650 nm (red). For example, the difference in Fresnel reflections at the substrate-polymeric film interface at 45° for wavelengths between about 450-650 nm may be less than about 0.04%, such as less than 0.035%, less than 0.03%, less than 0.025%, less than 0.02%, less than 0.015%, less than 0.005%, or less than 0.001%, including all ranges and subranges therebetween. Other relevant dispersion characteristics are described in U.S. Provisional Application No. 62/348,465, filed Jun. 10, 2016, and entitled "GLASS ARTICLES COMPRISING LIGHT EXTRACTION FEATURES," which is incorporated herein by reference in its entirety.

Substrate 110, polymeric film 120, LGP 100, 100', 100", and/or the adhesive layer (if present) can, in certain embodiments be transparent or substantially transparent. As used herein, the term "transparent" is intended to denote that the substrate, film, LGP, or adhesive has an optical transmission of greater than about 80% in the visible region of the spectrum (~420-750 nm) for a transmission length of 1 mm or less. For instance, an exemplary transparent material may have greater than about 85% transmittance in the visible light range, such as greater than about 90%, greater than about 95%, or greater than about 99% transmittance, including all ranges and subranges therebetween. In certain embodiments, an exemplary transparent material may have an optical transmittance of greater than about 50% in the ultraviolet (UV) region (~100-400 nm), such as greater than about 55%, greater than about 60%, greater than about 65%, greater than about 70%, greater than about 75%, greater than about 80%, greater than about 85%, greater than about 90%, greater than about 95%, or greater than about 99% transmittance, including all ranges and subranges therebetween.

In some embodiments, an exemplary transparent glass or polymeric material can comprise less than 1 ppm each of Co, Ni, and Cr. In some embodiments, the concentration of Fe is <about 50 ppm, <about 20 ppm, or <about 10 ppm. In other embodiments, Fe+30Cr+35Ni<about 60 ppm, Fe+30Cr+35Ni<about 40 ppm, Fe+30Cr+35Ni<about 20 ppm, or Fe+30Cr+35Ni<about 10 ppm. According to additional embodiments, an exemplary transparent glass or polymeric material can comprise a color shift $\Delta y<0.015$ or, in some embodiments, a color shift<0.008.

Color shift may be characterized by measuring variation in the x and y chromaticity coordinates of the extracted light along the length L of an LGP illuminated by standard white LED(s) such as the Nichia NFSW157D-E using the CIE 1931 standard for color measurements. The nominal color point of the LED(s) is chosen to be y=0.28 and x=0.29. For glass light-guide plates the color shift $\Delta y$ can be reported as $\Delta y=y(L_2)-y(L_1)$ where $L_2$ and $L_1$ are Z positions along the panel or substrate direction away from the source launch and where $L_2-L_1=0.5$ meters. Exemplary light-guide plates have $\Delta y<0.05$, $\Delta y<0.01$, $\Delta y<0.005$, $\Delta y<0.003$, or $\Delta y<0.001$. If the LGP has no light extraction features it may be characterized by adding a small area of light extraction features at each measurement point $L_1$ and $L_2$.

The optical light scattering characteristics of the LGP may also be affected by the nominal refractive index of the substrate and polymeric materials, as well as the adhesive (if present). According to various embodiments, the transparent substrate may have a nominal refractive index ranging from about 1.3 to about 1.8, such as from about 1.35 to about 1.7, from about 1.4 to about 1.65, from about 1.45 to about 1.6, or from about 1.5 to about 1.55, including all ranges and subranges therebetween. In some embodiments, the polymeric material may have a nominal index of refraction greater than that of the substrate. In other embodiments, the polymeric material may have a nominal refractive index substantially similar to that of the substrate. The adhesive layer, if present, may likewise have a nominal refractive index that is substantially similar to that of the substrate and/or polymeric film. As used herein, the term "nominal" refractive index refers to the refractive index near the peak of human eye response (e.g., about 550 nm). As used herein, the term "substantially similar" is intended to denote that two values are approximately equal, e.g., within about 10% of each other, such as within about 5% of each other, or within about 2% of each other in some cases. For example, in the case of a refractive index of 1.5, a substantially similar refractive index may range from about 1.35 to about 1.65.

According to various non-limiting embodiments, the LGP (glass+polymer) may have a relatively low level of light attenuation (e.g., due to absorption and/or scattering). For example, a combined attenuation $\alpha'$ for the LGP may be expressed as $\alpha'=(d_1/D)*\alpha_1+(d_2/D)*\alpha_2$, in which $d_1$ represents the overall thickness of the transparent substrate, $d_2$ represents the overall thickness of the polymeric film, D represents the overall thickness of the LGP ($D=d_1+d_2$), $\alpha_1$ represents the attenuation value of the transparent substrate, and $\alpha_2$ represents the attenuation value of the polymeric film. In certain embodiments, the combined attenuation $\alpha'$ may be less than about 5 dB/m for wavelengths ranging from about 420-750 nm. For instance, a' may be less than about 4 dB/m, less than about 3 dB/m, less than about 2 dB/m, less than about 1 dB/m, less than about 0.5 dB/m, less than about 0.2 dB/m, or even less, including all ranges and subranges therebetween, e.g., from about 0.2 dB/m to about 5 dB/m.

The combined attenuation of the LGP may vary depending, e.g., upon the thickness of the polymeric film and/or the ratio of polymer film thickness to overall LGP thickness ($d_2/D$). As such, the polymeric film thickness and/or transparent substrate thicknesses may be varied achieve a desired attenuation value. For instance, ($d_2/D$) may range from about ½ to about 1/50, such as from about ⅓ to about 1/40, from about ⅕ to about 1/30, or from about 1/10 to about 1/20, including all ranges and subranges therebetween.

The LGPs disclosed herein may be used in various display devices including, but not limited to LCDs. According to various aspects of the disclosure, display devices can comprise at least one of the disclosed LGPs coupled to at least one light source, which may emit blue, UV, or near-UV light (e.g., approximately 100-500 nm). In some embodiments, the light source may be a light emitting diode (LED). The optical components of an exemplary LCD may further comprise a reflector, a diffuser, one or more prism films, one or more linear or reflecting polarizers, a thin film transistor (TFT) array, a liquid crystal layer, and one or more color filters, to name a few components. The LGPs disclosed herein may also be used in various illuminating devices, such as luminaires or solid state lighting devices.

Methods

Also disclosed herein are methods for forming a light guide plate, the methods comprising applying a layer of polymeric material to a major surface of a transparent substrate, and shaping the polymeric material to produce a plurality of microstructures patterned with a plurality of light extraction features. According to various embodiments, the methods may comprise applying the layer of polymeric material to a major surface opposite the light emitting surface of the transparent substrate. In certain embodiments, the layer of polymeric material may be applied by screen printing. Shaping the polymeric material may be carried out, for example, by micro-replication, UV embossing, thermal embossing, or hot embossing. The methods disclosed herein may further comprise one or more steps for forming a shaping mold. The step of shaping the polymeric material may comprise applying the shaping mold to the layer of polymeric material.

Referring again to FIG. 2, in various embodiments, the polymeric film 120 may be applied to major surface 170 of transparent substrate 110 using a variety of methods, such as molding, printing, and/or lamination techniques. For instance, a layer of polymeric material may be printed (e.g., screen printing, inkjet printing, slot coating, microprinting, etc.), extruded, or otherwise coated onto the transparent substrate and subsequently imprinted or embossed with a desired surface pattern. Alternatively, while coating the transparent substrate with the polymeric material, the polymeric material may be imprinted or embossed with the desired pattern. These molding processes may be referred to as "micro-replication," in which a desired pattern is first manufactured as a mold and then pressed into the polymeric material to yield a negative replica of the mold shape. The polymeric material may be UV cured or thermally cured during or after imprinting, which may be referred to as "UV embossing" and "thermal embossing," respectively. Alternatively, the polymeric film may be applied using hot embossing techniques, in which the polymeric material is first heated to a temperature above its glass transition point, followed by imprinting and cooling. In additional non-limiting embodiments, the polymeric material may be applied as a film, e.g., laminated to the transparent substrate 110 using an intervening adhesive layer.

Figure 8A:
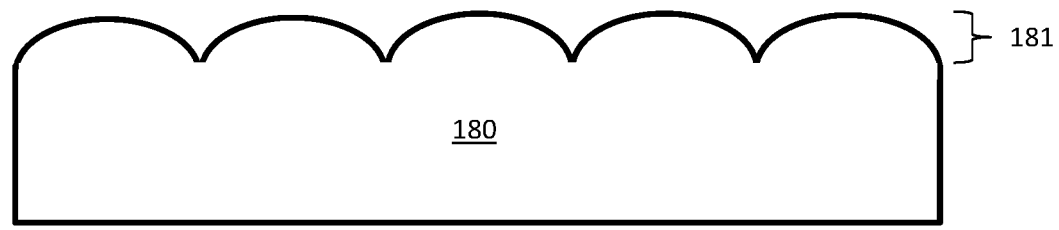
FIGS. 8A-8D and 9A-9H illustrate methods for forming a microstructured film and patterning the microstructured film according to non-limiting embodiments of the disclosure.
Figure 8B:
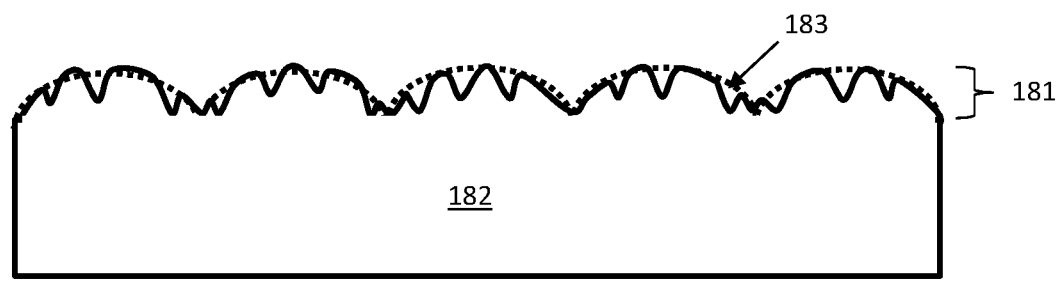
Figure 8C:
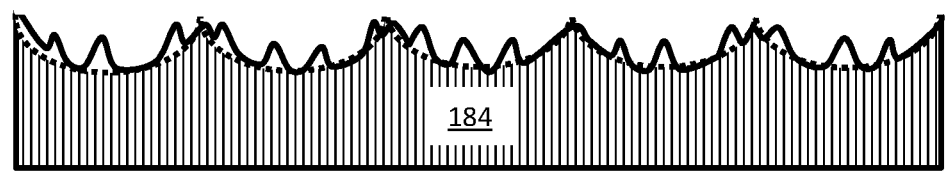
Figure 8D:
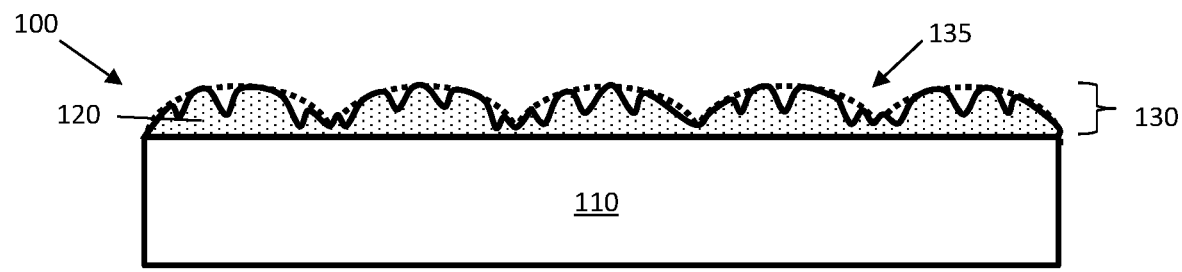

FIGS. 8A-D illustrate an exemplary method for forming a light guide plate, comprising forming a shaping mold and imprinting a polymeric material with said mold. In FIG. 8A, a first template 180 may be shaped or otherwise provided with a microstructure pattern 181. As shown in FIG. 8B, the first template 180 may be damaged, e.g., laser damaged, to produce a modified template 182 comprising a light extraction pattern 183. As illustrated in FIG. 8C, the modified template 182 may then be used to imprint a second template to produce a shaping mold 184. The shaping mold 184 may then be contacted with a layer of polymeric material coated onto a transparent substrate 110 to produce the light guide plate 100 of FIG. 8D, comprising a polymeric film 120 comprising a plurality of microstructures 130 patterned with a plurality of light extraction features 135.

Figure 9A:
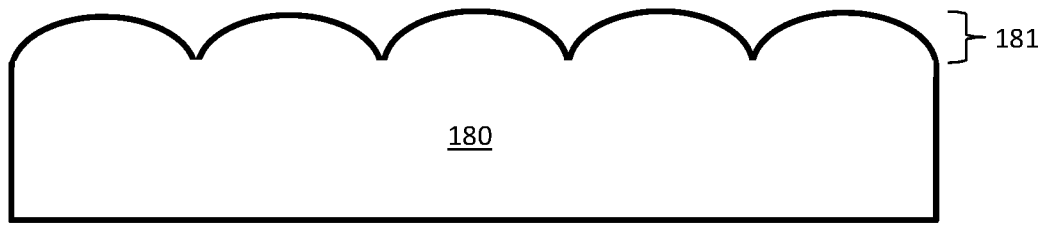
Figure 9B:
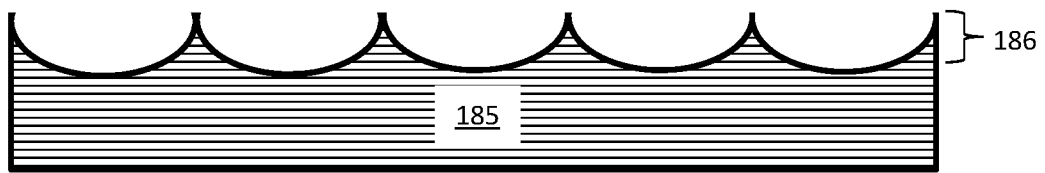
Figure 9C:
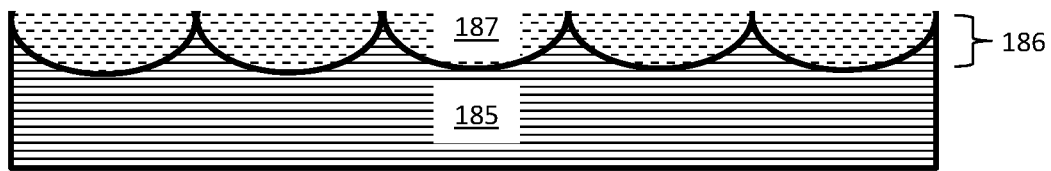
Figure 9D:
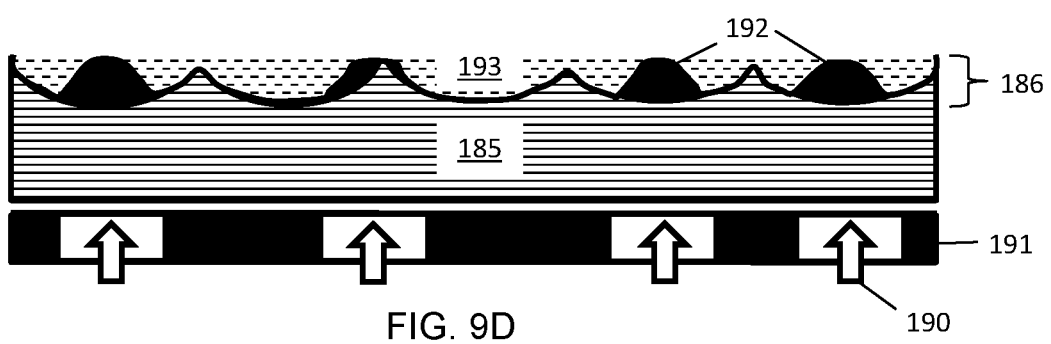
Figure 9E:
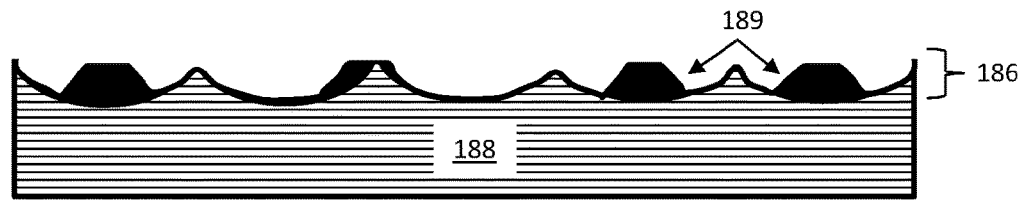
Figure 9F:
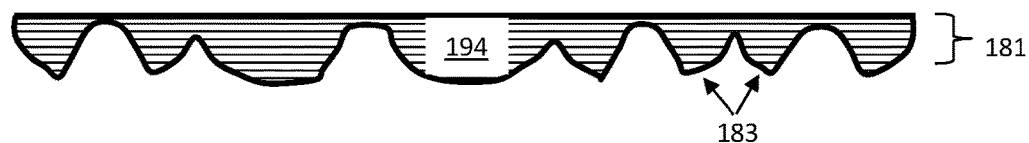
Figure 9G:
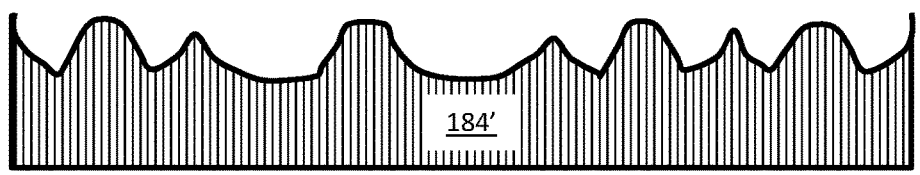
Figure 9H:
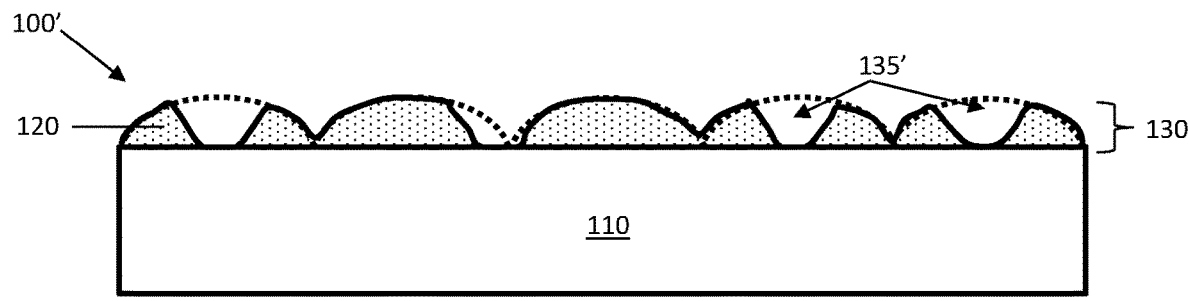

FIGS. 9A-H illustrate another exemplary method for forming a light guide plate, comprising forming a shaping mold and imprinting a polymeric material with said mold. In FIG. 9A, a first template 180 may be shaped or otherwise provided with a microstructure pattern 181. As shown in FIG. 9B, the first template 180 may be used to imprint a molding template to form a negative template 185 comprising an inverted microstructure pattern 186. Referring to FIG. 9C, a first material 187 may then be applied to the negative template 185, e.g., deposited in the inverted microstructure pattern 186. At least a portion of the first material 187 may then be removed as shown to form an inverted template 188 having an inverted microstructure pattern 186 and a temporary inverted light extraction pattern 189. For example, the first material 187 may comprise a photoresist material, which may be selectively exposed to UV radiation 190 through a mask 191, as shown in FIG. 9D to produce an irradiated portion 192 and an unexposed portion 193. The unexposed portion 193 may then be removed using lithography and/or etching techniques, as shown in FIG. 9E. Referring to FIG. 9F, inverted template 188 may be used to imprint an intermediate template 194 with a microstructure pattern 181 and a light extraction pattern 183. The intermediate template 194 can subsequently be used to imprint a final template to produce the shaping mold 184' of FIG. 9G. The shaping mold 184' may then be contacted with a layer of polymeric material coated onto a transparent substrate 110 to produce the light guide plate 100' of FIG. 9H, comprising a polymeric film 120 comprising a plurality of microstructures 130 patterned with a plurality of light extraction features 135'.

Also disclosed herein are methods for forming a light guide plate, the methods comprising applying a layer of polymeric material to at least one major surface of a glass substrate and modifying the polymeric material to produce a plurality of light extraction features. In some embodiments, applying the layer of polymeric material may comprise adding a liquid resin to the substrate surface and subsequently UV or thermal curing the resin to form a polymeric film. In other embodiments, applying the layer of polymeric material may comprise laminating a polymeric film to the substrate with an intervening adhesive layer. Upon application of the polymeric layer, the polymeric material may be modified to produce a plurality of light extraction features, e.g., by thermal and/or laser imprinting. The polymeric material may also be optionally shaped to produce a plurality of microstructures, e.g., by micro-replication, UV embossing, thermal embossing, or hot embossing.

Figure 10:
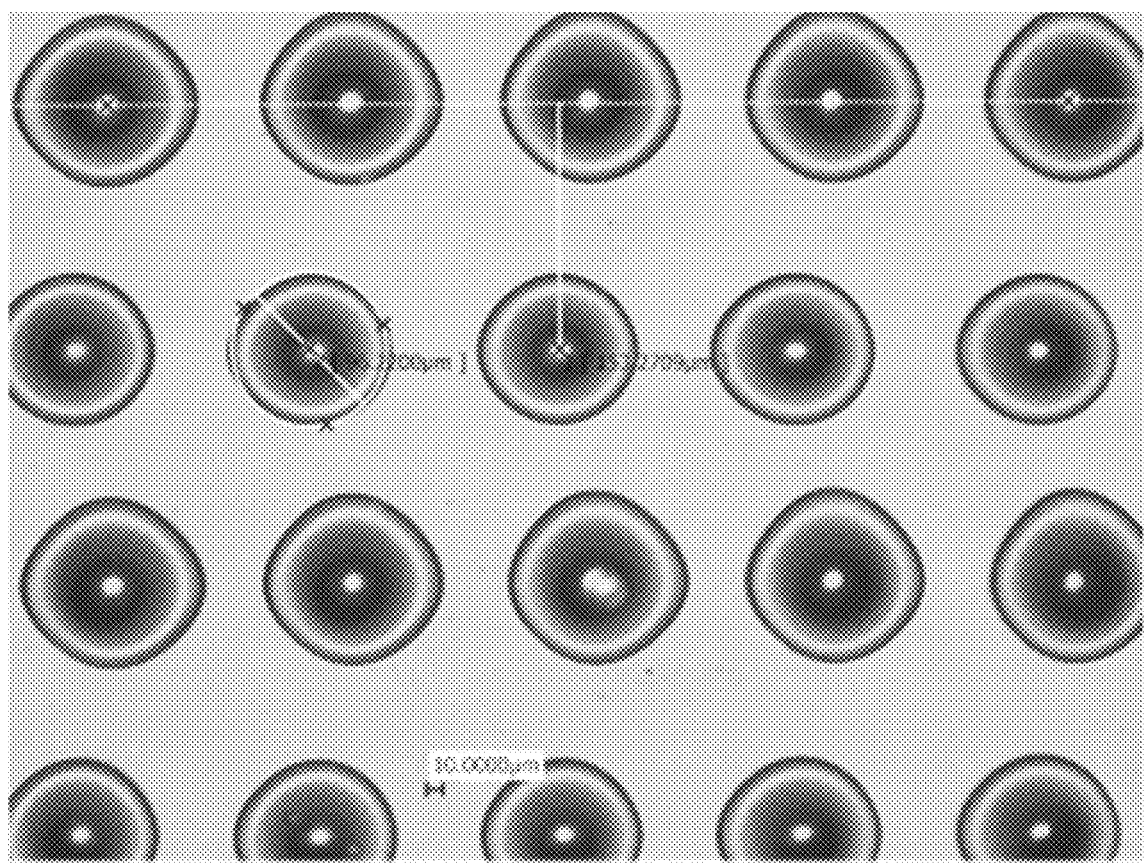
FIG. 10 illustrates an exemplary glass-polymer laminate LGP patterned with light extraction features.

FIG. 10 illustrates an exemplary LGP including a glass substrate laminated to a PET film (25 μm) using an optically clear adhesive (25 μm). The PET film was laser imprinted to produce an array of light extraction features. While the exemplary light extraction features are depicted in a periodic array, it is to be understood that non-periodic arrays are also possible, such as a gradient pattern. For instance, the light extraction features may be patterned with increasing density relative to the distance from a light source as depicted, e.g., in FIG. 1C.

Figure 11A:
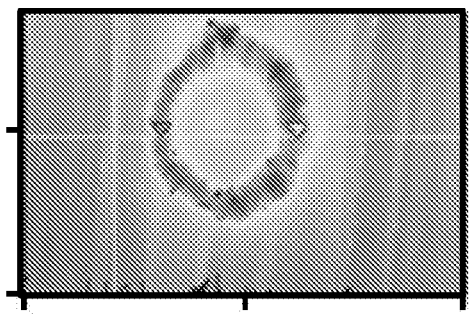
FIGS. 11A-C are topographical images of light extraction features formed according to some embodiments of the disclosure.
Figure 11B:
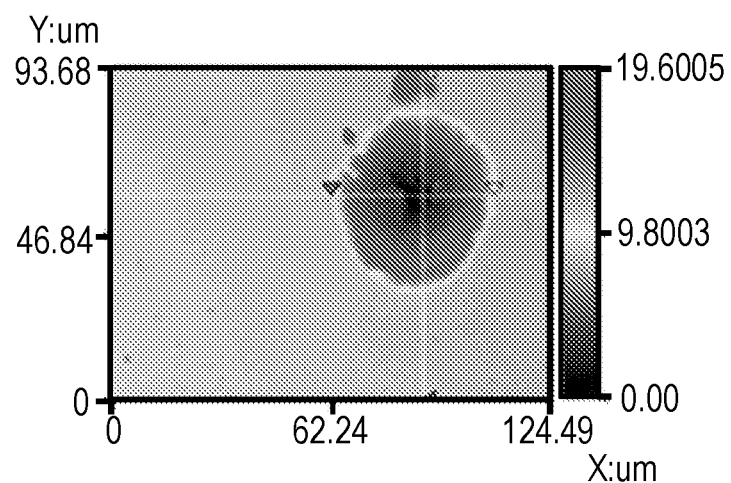
Figure 11C:
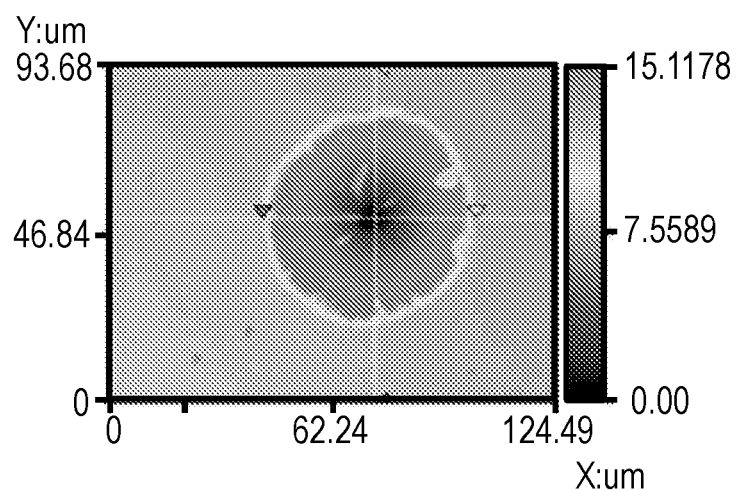

The methods disclosed herein may produce light extraction features 135, 135', 135" of varying shapes and sizes. For instance, referring to FIGS. 11A-C, the method depicted in FIG. 4 may be carried out, e.g., by laser damaging the first template, to produce light extraction features having the depicted topographical profiles. The array of individual light extraction features may be produced by scanning the laser relative to the LGP in a raster pattern or by using beam deflection system for more complex geometries. Exemplary lasers include, but are not limited to, Nd:YAG lasers, $CO_2$ lasers, and the like. The operating parameters of the laser, such as laser power, pulse duration, pulse energy, and other variables may vary depending on the desired light extraction feature profile. In some embodiments, the pulse duration may range from about 1 to about 1000 microseconds (μs), such as from about 5 to about 500 μs, from about 10 μs to about 200 μs, from about 20 μs to about 100 μs, or from about 30 μs to about 50 μs, including all ranges and subranges therebetween. The laser power may also range from about 1 to about 100 Watts (W), such as from about 5 to about 50 W, or from about 10 to about 35 W, including all ranges and subranges therebetween. The laser energy may range, for example, from about 0.01 to about 100 millijoules (mJ), such as from about 0.1 to about 10 mJ, from about 0.5 to about 5 mJ, or from about 1 mJ to about 2 mJ, including all ranges and subranges therebetween As shown in FIG. 11A, a laser may be used to create crater-like light extraction features, which may have a substantially parabolic cross-section as illustrated in FIG. 12A (see dashed line). Alternatively, as depicted in FIGS. 11B-C, a laser may be used to create conical light extraction features, which may have a substantially triangular cross section as illustrated in FIG. 12B (see dashed line). Alternatively, the method depicted in FIG. 9 may be carried out, e.g., using lithography techniques, to produce frusto-conical light extraction features, which may have a substantially trapezoidal cross section as illustrated in FIG. 12C (see dashed line). Of course, the light extraction features 135, 135', 135" may have any other shape, cross-section, or combination thereof, all of which are intended to fall within the scope of the disclosure. For instance, in non-limiting embodiments, laser imprinting may be used to create light extraction features in the shape of slots or gratings in the polymeric film, which can promote confinement of the light propagating in the LGP to one or more channels. Such channels can be used in place of, or in addition to, the microstructures to enhance 1D or 2D dimming capability, such that only one (or more) of the light sources contribute to the brightness of light within a given channel.

According to various embodiments, the transparent substrate may comprise a composition having a first glass transition temperature $T_{g1}$ that is greater than a second glass transition temperature $T_{g2}$ of the polymeric film. For instance, a difference between the glass transition temperatures $(T_{g1}-T_{g2})$ may be at least about 100° C., such as ranging from about 100° C. to about 800° C., from about 200° C. to about 700° C., from about 300° C. to about 600° C., or from about 400° C. to about 500° C., including all ranges and subranges therebetween. This temperature differential may allow the polymeric material to be molded to the transparent substrate without melting or otherwise negatively impacting the transparent substrate during the molding process. In other embodiments, the transparent substrate may have a first melting temperature $T_{m1}$ that is greater than a second melting temperature $T_{m2}$ of the polymeric film and/or a first viscosity $v_1$ that is greater than a second viscosity $v_2$ of the polymeric film at a given processing temperature.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a light source" includes examples having two or more such light sources unless the context clearly indicates otherwise. Likewise, a "plurality" or an "array" is intended to denote "more than one." As such, a "plurality of light scattering features" includes two or more such features, such as three or more such features, etc., and an "array of microstructures" includes two or more such microstructures, such as three or more such microstructures, and so on.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

Figure 13A:
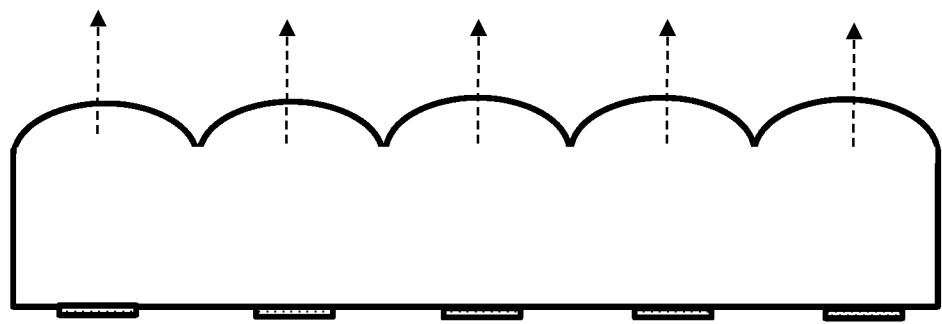
FIG. 13A illustrates an exemplary LGP comprising a microstructured surface and a printed surface.
Figure 13B:
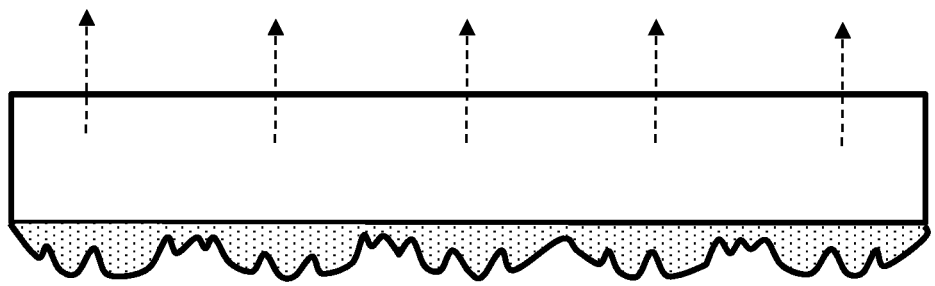
FIGS. 13B-C illustrates a light guide plate comprising a microstructured surface patterned with a plurality of light extraction features according to embodiments of the disclosure.
Figure 13C:
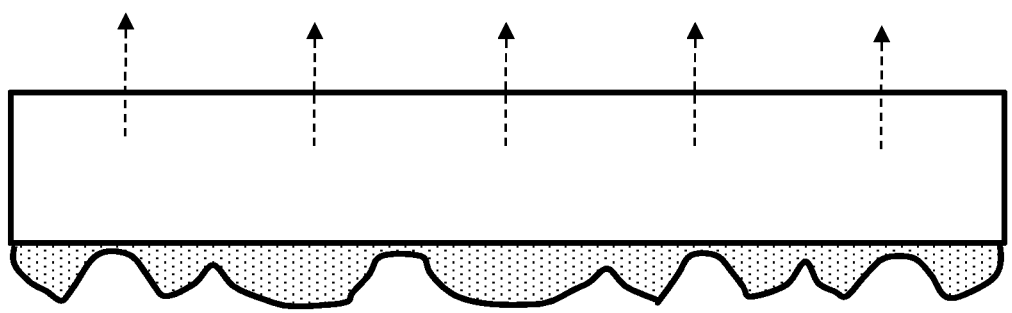
Figure 14A:
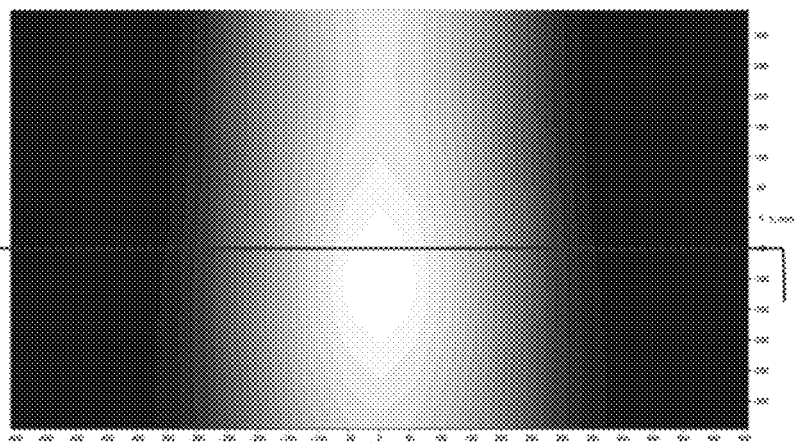
FIGS. 14A-E depict light beam width for various LGPs.
Figure 14B:
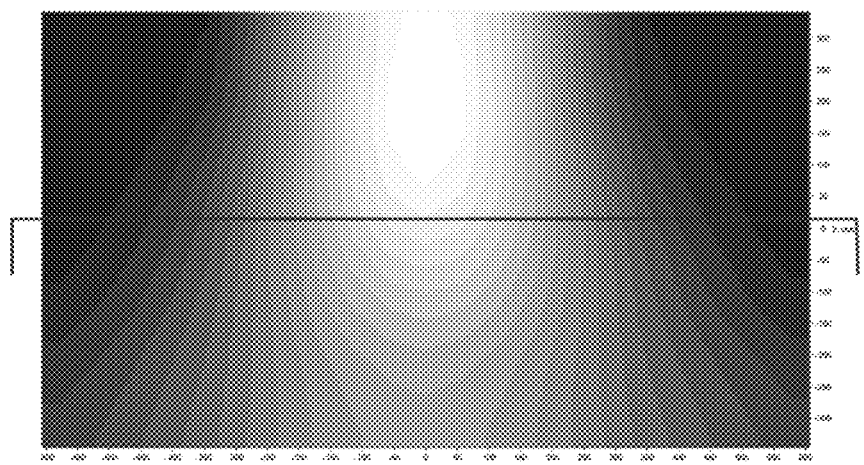
Figure 14C:
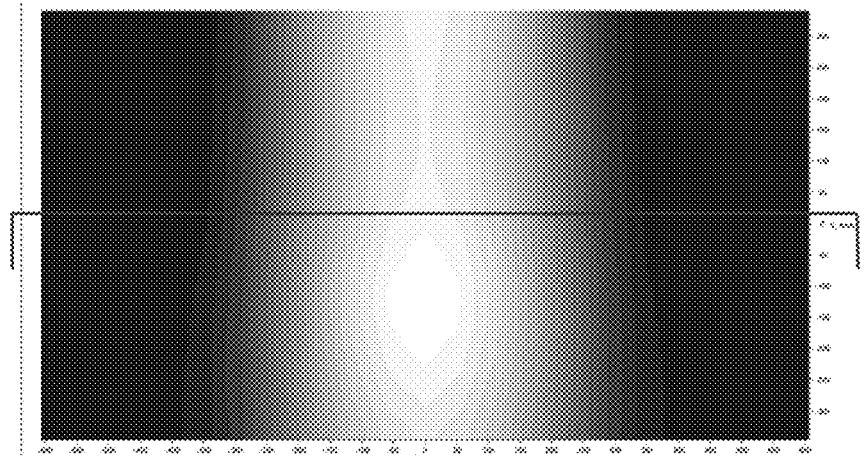
Figure 14D:
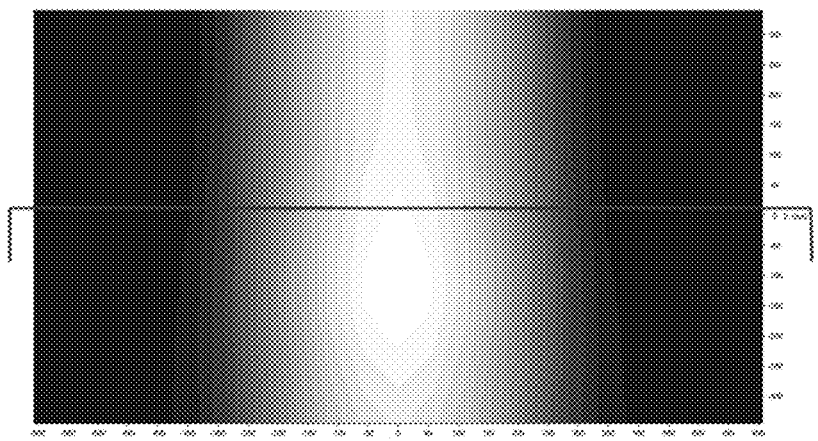
Figure 14E:
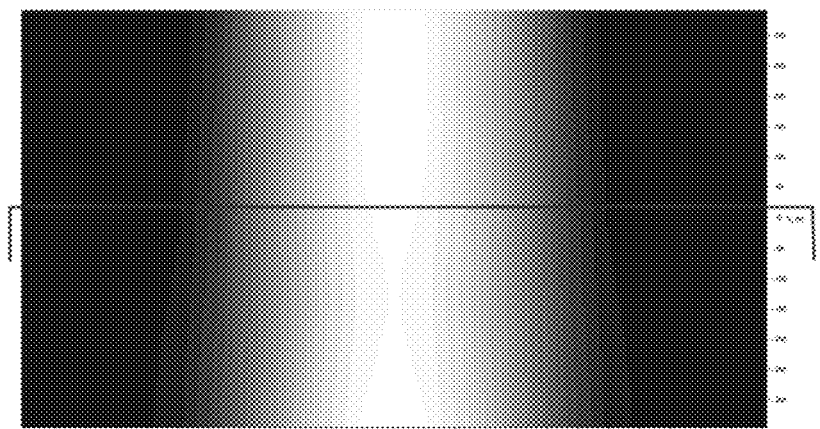
Figure 15:
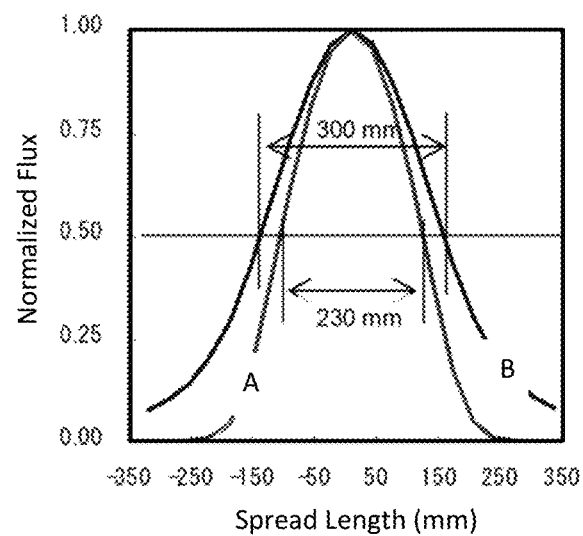
FIG. 15 is a graphical depiction of normalized light flux as a function of distance from the center of the light source for the configurations of FIGS. 14A-E.

Light guide plates (692.2×1212.4×2 mm) having various configurations were prepared using methyl methacrylate styrene (MS) or Corning Iris™ glass as the transparent substrate. One or both surfaces of the substrate were provided with microstructures and/or light extraction features, as indicated in Table I below. When present, the polymer films were matched to the refractive index of the transparent substrate. An LED light source (120 mm) was coupled to an edge surface of the LGPs. The configuration of Example 1 is illustrated by FIG. 13A, while the configurations of Examples 4 and 5 are illustrated in FIGS. 13B-C. Average surface luminance, luminance uniformity, and color shift (Δx, Δy) were measured for each sample. The results of these measurements are listed in Table I below. Images of the light beams produced by each configuration are illustrated in FIGS. 14A-E. Finally, normalized flux was of light emitted from the LGP was measured as a function of distance from the centerline of the LED and plotted in FIG. 15.

TABLE I

LGP Configurations and Measurements

| | Example 1 | Example 2 | Example 3 | Example 4 | Example 5 |
|---|---|---|---|---|---|
| Substrate | MS | Iris ™ | Iris ™ | Iris ™ | Iris ™ |
| Pattern 1* | Lenticular micro- | None | Lenticular micro- | None | None |

TABLE I-continued

LGP Configurations and Measurements

| | Example 1 | Example 2 | Example 3 | Example 4 | Example 5 |
|---|---|---|---|---|---|
| Pattern 2* | structure Printed ink | Printed ink | structure Printed ink | Patterned lenticular micro-structure | Patterned lenticular micro-structure |
| Surface Luminance (avg) | 108% | 100% | 108% | 112% | 108% |
| Luminance Uniformity (9 point) | 86% | 87% | 88% | 83% | 93% |
| Δx | 0.0026 | 0.0025 | 0.0024 | 0.0023 | 0.0023 |
| Δy | 0.0063 | 0.0082 | 0.0074 | 0.0070 | 0.0071 |

*Pattern 1: light emitting surface; Pattern 2: opposing major surface

As demonstrated by Table I above, the LGPs of Examples 4-5 (comprising a patterned microstructure on the major surface opposing the light emitting surface) exhibit a comparable optical performance as compared to MS and glass LGPs with microstructures on the light emitting surface and extraction features on the opposite major surface (Examples 1 and 3). The images presented in FIGS. 14A-E also reflect a comparable local dimming efficiency for these examples, with each of Examples 1 and 3-5 exhibiting a full wave half maximum (FWHM) value of 230 mm (curve A in FIG. 15), which is significantly narrower than the FHWM value of 300 mm for Example 2, which does not have a microstructured surface (curve B in FIG. 15).

Using methods disclosed herein, an LGP surface can be simultaneously provided with microstructures and light extraction features using a single pre-fabricated mold, which may be simpler and/or more cost-effective as compared to separate steps of microstructuring and printing extraction features. Moreover, the microstructures and extraction features can be formed on a single surface of the LGP, thereby allowing for additional configurations on the opposing surface of the LGP. Finally, LGPs comprising such patterned microstructure surfaces can have an optical performance and/or local dimming efficiency comparable to that of LGPs having microstructures on one surface and extraction features on the opposite surface.

What is claimed is:

1. A light guide plate comprising:
(a) a transparent substrate having an edge surface, a light emitting first major surface, and an opposing second major surface, wherein the transparent substrate is a glass substrate; and
(b) a polymeric film disposed on the second major surface of the transparent substrate, wherein the polymeric film comprises a plurality of microstructures patterned with a plurality of light extraction features disposed inside the plurality of microstructures, wherein a thickness of the polymeric film ranges from 5 μm to 500 μm,
wherein the plurality of microstructures are convex microstructures over the second major surface, the plurality of light extraction features are concave recessions in a periodic array and defined by the plurality of microstructures, each of the plurality of microstructures includes at least one of the plurality of light extraction features, and each of the plurality of light extraction features has a crater, frustoconical, or conical shape having a parabolic, trapezoidal, or triangular cross-sectional profile, respectively,
wherein at least one microstructure in the plurality of microstructures comprises an aspect ratio ranging from 0.1 to 3, and
wherein the light guide plate comprises a color shift Δy of less than 0.05.

2. The light guide plate of claim 1, wherein the glass substrate comprises, on a mol % oxide basis:
50-90 mol % $SiO_2$,
0-20 mol % $Al_2O_3$,
0-20 mol % $B_2O_3$,
0-20 mol % $P_2O_5$, and
0-25 mol % $R_xO$,
wherein x is 2 and R is chosen from Li, Na, K, Rb, Cs, and combinations thereof, or wherein x is 1 and R is chosen from Zn, Mg, Ca, Sr, Ba, and combinations thereof.

3. The light guide plate of claim 1, wherein the transparent substrate comprises less than 1 ppm each of Co, Ni, and Cr.

4. The light guide plate of claim 1, wherein the polymeric film comprises a UV curable or thermally curable polymer.

5. The light guide plate of claim 1, further comprising a second polymeric film disposed on the first major surface of the transparent substrate, the second polymeric film comprising a plurality of microstructures, a plurality of light extraction features, or both.

6. The light guide plate of claim 1, wherein the plurality of microstructures comprises a periodic or non-periodic array of prisms, rounded prisms, or lenticular lenses.

7. The light guide plate of claim 1, wherein at least one light extraction feature in the plurality of light extraction features has a dimension that is less than 100 μm.

8. A light guide assembly comprising at least one light source optically coupled to the light guide plate of claim 1.

9. A display, lighting, or electronic device comprising the light guide plate of claim 1 or the light guide assembly of claim 8.

10. The light guide plate of claim 1, wherein the plurality of microstructures comprises a periodic array of lenticular lenses.

11. A method for forming a light guide plate, comprising:
(a) applying a layer of polymeric material to a major surface of a transparent substrate, wherein the transparent substrate is a glass substrate, a thickness of the polymeric film ranges from 5 μm to 500 μm;
(b) shaping the polymeric material to produce a plurality of microstructures patterned with a plurality of light extraction features disposed inside the plurality of microstructures,
wherein the plurality of microstructures are convex microstructures over the second major surface, the plurality of light extraction features are concave recessions in a periodic array and defined by the plurality of microstructures, each of the plurality of microstructures includes at least one of the plurality of light extraction features, and each of the plurality of light extraction features has a crater, frustoconical, or conical shape having a parabolic, trapezoidal, or triangular cross-sectional profile, respectively,
wherein at lease one microstructure in the plurality of microstructures comprises an aspect ratio ranging from 0.1 to 3, and
wherein the light guide plate comprises a color shift Δy of less than 0.05.

12. The method of claim 11, wherein the surface is a major surface opposite a light emitting surface of the transparent substrate.

13. The method of claim 11, wherein applying a layer of polymeric material comprises screen printing.

14. The method of claim 11, wherein shaping the polymeric material comprises micro-replication, UV embossing, thermal embossing, or hot embossing.

15. The method of claim 11, further comprising manufacturing a shaping mold by:
 (a) laser damaging a first template comprising a microstructure pattern to produce a modified template comprising a light extraction pattern,
 (b) imprinting a second template with the modified template to form a shaping mold.

16. The method of claim 15, wherein shaping the polymeric material comprises applying the shaping mold to the layer of polymeric material.

17. The method of claim 11, further comprising creating a shaping mold by:
 (a) imprinting a microstructure pattern into a molding template to form a negative template comprising an inverted microstructure pattern;
 (b) applying a first material to the negative template;
 (c) removing at least a portion of the first material to form an inverted template having an inverted microstructure pattern and a temporary inverted light extraction pattern;
 (d) imprinting second template with the inverted template to form an intermediate template; and
 (e) imprinting a third template with the intermediate template to form a shaping mold.

18. The method of claim 17, wherein the first material is a photoresist material and a portion of the photoresist material is selectively removed by a lithography technique.

19. The method of claim 17, wherein shaping the polymeric material comprises applying the shaping mold to the layer of polymeric material.

20. A light guide plate comprising:
 (a) a glass substrate having an edge surface, a light emitting first major surface, and an opposing second major surface;
 (b) a polymeric film disposed on at least one of the first major surface and the second major surface of the glass substrate, wherein the polymeric film comprises a plurality of microstructures and a plurality of light extraction features patterned inside the plurality of microstructures, wherein a thickness of the polymeric film ranges from 5 µm to 500 µm; and
 an intervening adhesive layer disposed between the polymeric film and the glass substrate, the intervening adhesive layer being transparent,
 wherein the plurality of microstructures are convex microstructures over the second major surface, the plurality of light extraction features are concave recessions in a periodic array and defined by the plurality of microstructures, each of the plurality of microstructures includes at least one of the plurality of light extraction features, and each of the plurality of light extraction features has a crater, frustoconical, or conical shape having a parabolic, trapezoidal, or triangular cross-sectional profile, respectively, and
 wherein at least one microstructure in the plurality of microstructures comprises an aspect ratio ranging from 0.1 to 3.

21. The light guide plate of claim 20, wherein the light guide plate comprises a color shift $\Delta y$ of less than 0.05.

22. The light guide plate of claim 20, wherein the polymeric film comprises a UV curable or thermally curable polymer.

23. The light guide plate of claim 20, wherein the plurality of microstructures comprises a periodic or non-periodic array of prisms, rounded prisms, or lenticular lenses.

24. The light guide plate of claim 20, wherein a nominal refractive index of the polymeric film is substantially equal to a nominal refractive index of the glass substrate.

25. A light guide assembly comprising at least one light source optically coupled to the light guide plate of claim 20.

26. The light guide assembly of claim 25, wherein the plurality of light extraction features is patterned with increasing density relative to a distance from the at least one light source.

27. A display, lighting, or electronic device comprising the light guide plate of claim 24 or the light guide assembly of claim 26.

28. A method for forming a light guide plate, comprising:
 (a) applying a layer of polymeric material to at least one major surface of a glass substrate, wherein a thickness of the polymeric film ranges from 5 µm to 500 µm; and
 (b) modifying the polymeric material to produce a plurality of microstructures and a plurality of light extraction features patterned inside the plurality of microstructures, wherein the polymeric film is laminated to the glass substrate with an intervening adhesive layer, the intervening adhesive layer being transparent,
 wherein the plurality of microstructures are convex microstructures over the second major surface, the plurality of light extraction features are concave recessions in a periodic array and defined by the plurality of microstructures, each of the plurality of microstructures includes at least one of the plurality of light extraction features, and each of the plurality of light extraction features has a crater, frustoconical, or conical shape having a parabolic, trapezoidal, or triangular cross-sectional profile, respectively, and
 wherein at least one microstructure in the plurality of microstructures comprises an aspect ratio ranging from 0.1 to 3.

29. The method of claim 28, wherein applying a layer of polymeric material comprises applying a liquid resin to the at least one major surface and UV curing or thermal curing the liquid resin.

30. The method of claim 28, wherein applying a layer of polymeric material comprises laminating a polymeric film to the at least one major surface with an intervening adhesive layer.

31. The method of claim 28, wherein modifying the polymeric material comprises forming a pattern of light extraction features by laser imprinting, thermal imprinting, or both.

32. The method of claim 28, further comprising shaping the polymeric material to create a plurality of microstructures using micro-replication, UV embossing, thermal embossing, or hot embossing.

33. The method of claim 32, wherein the plurality of microstructures comprises a periodic or non-periodic array of prisms, rounded prisms, or lenticular lenses.

* * * * *

UNITED STATES PATENT AND TRADEMARK OFFICE
CERTIFICATE OF CORRECTION

PATENT NO. : 11,022,745 B2
APPLICATION NO. : 16/474460
DATED : June 1, 2021
INVENTOR(S) : Dana Craig Bookbinder et al.

Page 1 of 1

It is certified that error appears in the above-identified patent and that said Letters Patent is hereby corrected as shown below:

On the Title Page

On page 2, in Column 2, item (56), Other Publications, Line 5, delete "Office Patent." and insert -- Patent Office. --, therefor.

In the Claims

In Column 22, Line 58, Claim 11, delete "lease" and insert -- least --, therefor.

In Column 24, Line 18, Claim 27, delete "24" and insert -- 20 --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*